US007859533B2

(12) United States Patent
Kitayama et al.

(10) Patent No.: US 7,859,533 B2
(45) Date of Patent: Dec. 28, 2010

(54) DATA PROCESSING APPARATUS AND PARAMETER GENERATING APPARATUS APPLIED TO SURROUND SYSTEM

(75) Inventors: Toru Kitayama, Hamamatsu (JP); Kenichi Tamiya, Hamamatsu (JP); Koji Kushida, Hamamatsu (JP); Masao Kondou, Tokyo-to (JP)

(73) Assignee: Yamaha Corporation, Hamamatsu-shi (JP)

( * ) Notice: Subject to any disclaimer, the term of this patent is extended or adjusted under 35 U.S.C. 154(b) by 1303 days.

(21) Appl. No.: 11/397,998

(22) Filed: Apr. 4, 2006

(65) Prior Publication Data

US 2006/0251260 A1 Nov. 9, 2006

(30) Foreign Application Priority Data

Apr. 5, 2005 (JP) ............................ 2005-108309
Apr. 5, 2005 (JP) ............................ 2005-108312
Apr. 5, 2005 (JP) ............................ 2005-108314

(51) Int. Cl.
*G06T 11/20* (2006.01)

(52) U.S. Cl. ...................................................... 345/440

(58) Field of Classification Search ................ 345/440, 345/672

See application file for complete search history.

(56) References Cited

U.S. PATENT DOCUMENTS 5,212,733 A * 5/1993 DeVitt et al. ................ 381/119
5,579,396 A * 11/1996 Iida et al. ...................... 381/18
5,636,283 A 6/1997 Hill et al.
7,742,609 B2 * 6/2010 Yeakel et al. ............... 381/119
2003/0202667 A1 10/2003 Sekine

FOREIGN PATENT DOCUMENTS

JP 06-269100 A 9/1994
JP 2000-224700 A 8/2000
JP 2003-271135 9/2003
JP 2003-316371 A 11/2003
JP 2004-193877 A 7/2004
JP 2004-212797 7/2004
JP 2004-312109 11/2004

OTHER PUBLICATIONS

Office Action mailed Feb. 18, 2010, for JP Patent Application No. 2005-108309, with partial English Translation, nine pages.

* cited by examiner

*Primary Examiner*—Ryan R Yang
(74) *Attorney, Agent, or Firm*—Morrison & Foerster LLP

(57) ABSTRACT

Calculation is performed for sound paths 112-1, 114-1 along which sounds emitted from a sound emitting point 104 in an acoustic space 102 are reflected and delivered to a sound receiving point 106. By the calculation, entering angles ⊖R1, ⊖R2 by which the sound paths enter the front side 106*a* of the sound receiving point 106 are obtained. Calculation is then performed to obtain angles by which respective speakers 52C, 52L, 52R, 52SR, 52SL of a 5.1 surround system are arranged in a listening room, with the front side 106*a* of the sound receiving point 106 centered thereon. Audio signals on the respective sound paths are distributed among channels for any two speakers. Consequently, sharp localization of sound images is achieved, requiring less calculation in simulating acoustic characteristics of the acoustic space 102 in which the sound emitting point 104 for emitting sounds and the sound receiving point 106 for receiving the sounds are placed.

8 Claims, 20 Drawing Sheets

DATA PROCESSING APPARATUS AND PARAMETER GENERATING APPARATUS APPLIED TO SURROUND SYSTEM

BACKGROUND OF THE INVENTION

1. Field of the Invention

The present invention relates to a data processing apparatus and a parameter generating apparatus suitable for use in creating audio sources to be reproduced on a surround system. The present invention also relates to a computer program applied to these apparatuses.

2. Description of the Related Art

Assume that a sound emitting point at which a sound is emitted and a sound receiving point at which the sound is received are placed in an acoustic space such as a room having a rectangular parallelepiped shape. The sound receiving point is a human, microphone or the like. In this case, sounds emitted from the sound emitting point reflect on various parts of the acoustic space before reaching the sound receiving point. Disclosed in Japanese Patent Laid-Open Publication No. 2004-212797 and Japanese Patent Laid-Open Publication No. 2004-312109 are apparatuses for simulating such propagation of sounds to the sound receiving point on a computer to reproduce on a 4-channel stereo system. In FIG. 1A, for example, respective speakers 52L, 52R, 52SR, 52SL are placed at positions that correspond to the four corners of a square, with a listener centered thereon. Assume that the listener is placed at a sound receiving point 106 with a hypothetical sound emitting point 104 placed in the direction of the midpoint between the speakers 52L, 52R, and the sound pressure level of a direct sound reaching the sound receiving point 106 from the sound emitting point 104 is P. According to the art described in Japanese Patent Laid-Open Publication No. 2004-212797, a direct sound emitted from the hypothetical sound emitting point 104 can be simulated by emitting a sound having the sound pressure level of "P/2" from the respective speakers 52L, 52R to the sound receiving point 106. In FIG. 1A, reflected sounds are omitted.

In Japanese Patent Laid-Open Publication No. 2004-312109, furthermore, there is disclosed an art for changing the level of audio signals on a 4-channel stereo system in accordance with "the orientation of a sound receiving point". Assume that the sound receiving point is a "human", for example. In this case, the sound pressure perceived by the human ears varies between a case in which the human hears a sound having a sound pressure P from the front and a case in which the human hears the sound from the back. In this art, therefore, the orientation of the sound receiving point is taken as a parameter to change the level of audio signals. In Japanese Patent Laid-Open Publication No. 2004-312109, furthermore, there is also disclosed an art in which a sound emitting point and a sound receiving point are placed at an arbitrarily chosen position in an acoustic space, and the sound emitting point is automatically moved along a given path. In U.S. Pat. No. 5,636,283, furthermore, there is disclosed an art which allows a user to arbitrarily specify a course along which a sound emitting point moves, and reproduces the move of the sound emitting point along the course on a 4-channel stereo system.

In Japanese Patent Laid-Open Publication No. 2003-271135, there is disclosed an art for rotating a sound field to be reproduced by a multi-channel reproducing apparatus by given angle. This is achieved by mixing multi-channel signals in a mixing ratio corresponding to the rotation angle. Assuming that in FIG. 1B having audio signals S_L, S_R, S_SR, S_SL that form a 4-channel stereo system, for example, audio signals realizing a sound field that is rotated 45 degrees to the right are emitted from respective speakers 52L, 52R, 52SR, 52SL. In this case, each of the original audio signals S_L, S_R, S_SR, S_SL is mixed with its neighboring audio signal in the ratio of "½" to emit the resultant audio signals S_L', S_R', S_SR', S_SL' from the speakers 52L, 52R, 52SR, 52SL.

In the arts described in Japanese Patent Laid-Open Publication No. 2004-212797 and Japanese Patent Laid-Open Publication No. 2004-312109, the orientation of the sound receiving point 106 is utilized in order to determine the level of sounds to be delivered to the sound receiving point 106, however, it is not utilized in order to determine the localization between the speakers. More specifically, the orientation of the sound receiving point 106 is limited to predetermined directions. To determine the localization between the speakers in accordance with the orientation of the sound receiving point 106, therefore, the art disclosed in Japanese Patent Laid-Open Publication No. 2003-271135 is also required. Assume that in FIG. 1A, for example, the sound receiving point 106 is a human with his face rotating 45 degrees to the left. In a case where sounds to be delivered to the sound receiving point 106 are simulated for a listener in a listening room, if the listener in the listening room faces the front, the sound field can be simulated by rotating the entire sound field 45 degrees to the right. In this case, the sound image of the sound emitting point 104 has to be placed to the direction of the speaker 52R when viewed from the listener.

If the sound field is rotated by use of the art disclosed in Japanese Patent Laid-Open Publication No. 2003-271135, the sound pressure from the respective speakers are: S_L'=P/4 in the speaker 52L, S_R'=P/2 in the speaker 52R, S_SR'=P/4 in the speaker 52SR. Although the above sound pressure brings agreement between the center of the sound image and the orientation of the speaker 52R and makes the total sum of the sound pressure agree with "P", there still exists a problem that the sound image sounds blurred because a sound that simulates the sound emitting point 104 is separated to be output from the three speakers. In addition, there is another problem that complicated calculation is required to rotate a sound field by use of the art disclosed in Japanese Patent Laid-Open Publication No. 2003-271135 after generation of multi-channel signals by use of the arts disclosed in Japanese Patent Laid-Open Publication No. 2004-212797 and Japanese Patent Laid-Open Publication No. 2004-312109.

In some cases, furthermore, a change in the size of the acoustic space is required, with relative layout of the sound emitting point 104 and the sound receiving point 106 in the acoustic space being maintained. In such cases, however, on using the arts disclosed in Japanese Patent Laid-Open Publication No. 2004-312109 and U.S. Pat. No. 5,636,283, a user is required quite complicated operations such as specifying the size of the acoustic space and the position of the sound emitting point 104 and the sound receiving point 106 individually. Therefore, it is convenient for the user if the user can intuitively grasp, on a screen, the relationship between the acoustic space and the simulated settings in which a listener is listening contents in a listening room.

In other cases, furthermore, a plurality of elements such as the sound emitting point 104 and the sound receiving point 106 in the acoustic space are required to move at one time with given relationship between the elements being maintained. When the arts disclosed in Japanese Patent Laid-Open Publication No. 2004-312109 and U.S. Pat. No. 5,636,283 are used, however, complicated operations are required such as moving the sound emitting point 104 and the sound receiving point 106 individually.

SUMMARY OF THE INVENTION

The present invention was accomplished to solve the above-described problems, featuring configurations described below. Numerals within parentheses exemplify the relation between respective parts and an embodiment.

It is a first feature of the present invention to provide a data processing apparatus for simulating acoustic characteristics of an acoustic space (102) in which a sound emitting point (104) for emitting a sound and a sound receiving point (106) for receiving the sound emitted from the sound emitting point (104) are placed, the data processing apparatus comprising a sound receiving point orientation specifying portion (operation processing portion for a sound receiving point orientation image 212*a*) for specifying the orientation of the sound receiving point (106) in the acoustic space (102); a sound path calculating portion (SP112, SP114) for calculating a plurality of sound paths along which sounds travel from the sound emitting point (104) to the sound receiving point (106); a distribution ratio defining portion (SP118) for defining, on the basis of an entering angle (θR) of each of the calculated sound paths which enter the sound receiving point (106) with respect to the orientation of the sound receiving point (106), distribution ratio (FIG. 4) of audio signals for at least three or more channels, the distribution ratio being defined for each of the sound paths; and a distributing portion (62, 64, 66) for distributing a plurality of audio signals on the sound paths among the channels in accordance with the defined distribution ratio.

In this case, the audio signals for the channels include at least first to third audio signals (S_R, S_C, S_L). The distribution ratio defining portion (SP118) defines the audio signal distribution ratio for the respective sound paths as follows (FIG. 4). The sum of the distribution ratio of the first audio signal (S_R) and the second audio signal (S_C) accounts for 100% when the entering angle (θR) is within a first range (330°≦θR≦360°); The sum of the distribution ratio of the second and third audio signals (S_C, S_L) accounts for 100% when the entering angle (θR) is within a second range (0°≦θR≦30°) which is adjacent to the first range. The distribution ratio of the second audio signal (S_C) increases with increasing proximity of the entering angle (θR) to a boundary value (0°) between the first and second ranges.

The data processing apparatus further includes a delay portion (60) for delaying audio signals on the sound paths more with increasing distance of the sound paths; and an attenuation processing portion (62, 64, 66, SP118) for attenuating audio signals on the sound paths more with increasing distance of the sound paths.

Furthermore, the data processing apparatus further includes a display control portion (SP78, SP90, SP94) for displaying, on a display unit, an acoustic space image (204) representative of the acoustic space (102), a sound emitting point image (210) representative of the sound emitting point (104), a sound receiving point image (212) representative of the sound receiving point (106), and a speaker image (214) representative of a plurality of speakers arranged in a given correlation with respect to a front side, wherein the speaker image (214) is displayed around the sound receiving point image (212) with the orientation of the sound receiving point (106) being defined as the front side.

According to the first feature, the audio signal distribution ratio for the respective sound paths is determined on the basis of the entering angle by which the respective sound paths enter the sound receiving point, so that audio signals on the respective sound paths are distributed among the channels for multi-channel audio signals. Due to the first feature, sharp localization of sound images is achieved by less calculation.

It is a second feature of the present invention to provide a parameter generating apparatus for generating a parameter (tap position of a delay portion 60, attenuation factor provided for respective multipliers of a PAN control portion 62, matrix misers 64, 66, etc.) for use in simulation of acoustic characteristics of an acoustic space (102) in which a sound emitting point (104) for emitting a sound and a sound receiving point (106) for receiving the sound emitted from the sound emitting point (104) are placed, the parameter being used for processing an audio signal (Si) output from the sound emitting point (104) to synthesize an audio signal to be received at the sound receiving point (106), the parameter generating apparatus comprising a display control portion (SP6) for displaying, on a display unit, an acoustic space image (204) representative of the acoustic space (102), a sound emitting point image (210) representative of the sound emitting point (104), and a sound receiving point image (212) representative of the sound receiving point (106) in a specified scale; a change portion (SP8) for changing, when a change to the scale is instructed, information representative of the size of the acoustic space (102), the position of the sound emitting point (104), and the position of the sound receiving point (106) such that the acoustic space image (204), the sound emitting point image (210) and the sound receiving point image (212) are displayed at the same position on the display unit both before and after the change in the scale; and a parameter generating portion (SP112 through SP132) for generating the parameter on the basis of the resultant information changed by the change portion (SP8).

In this case, the parameter generating apparatus further includes a speaker display control portion (SP4, SP6) for displaying, on the display unit, a speaker image (214) representative of a plurality of speakers spaced apart by a given distance such that the speakers surround the sound receiving point image (212) with the given distance being adjusted in accordance with the scale.

According to the second feature, the size of the acoustic space and the position of the sound emitting point and the sound receiving point are re-specified in response to the change in the scale such that the acoustic space image, the sound emitting point image and the sound receiving point image are displayed at the same position as the position where they were displayed in the previous scale. In other words, a user's operation for changing scale also causes automatic refresh of various settings of the acoustic space. In addition, the second feature in which the speaker image is displayed on the display unit enables the user to intuitively grasp, on the screen, the relation between an assumed listening room and the acoustic space.

It is a third feature of the present invention to provide a parameter generating apparatus for generating a parameter (tap position of a delay portion 60, attenuation factor provided for respective multipliers of a PAN control portion 62, matrix mixers 64, 66, etc.) for use in simulation of acoustic characteristics of an acoustic space (102) in which elements including a sound emitting point (104) for emitting a sound and a sound receiving point (106) for receiving the sound emitted from the sound emitting point (106) are placed, the parameter being used for processing an audio signal (Si) output from the sound emitting point (104) to synthesize an audio signal to be received at the sound receiving point (106), the parameter generating apparatus comprising a display control portion (SP6) for displaying, on a display unit, a plurality of operational elements including at least a sound emitting point image (210) representative of the sound emitting point (104) and a sound receiving point image (212) representative of the sound receiving point (106), and an acoustic space image (204) representative of the acoustic space (102); a selection portion (SP29) for simultaneously selecting a plurality of operational elements from among the entire operational elements in accordance with a user's operation; a transfer limiting portion (depressing of Ctrl key or Alt key) for limiting a manner in which the simultaneously selected operational elements are transferred (allowing transfer only along a supplemental line); a transfer determining portion (SP76, SP88, SP92) for determining, when transfer of the simultaneously selected operational elements is instructed, a state in which the simultaneously selected operational elements are transferred (distance of transfer on a supplemental line or rotation angle) on the basis of the instruction for transfer and the limited transfer manner; a display position modifying portion (SP78, SP90, SP94) for modifying the position at which the simultaneously selected operational elements are displayed on the display unit on the basis of the determined transfer state; an acoustic space internal position modifying portion (SP80) for modifying, on the basis of the determined transfer state, information representative of the position of operational elements placed in the acoustic space (102); and a parameter generating portion (SP112 through SP132) for generating the parameter on the basis of the resultant information modified by the acoustic space internal position modifying portion (SP80).

In this case, the transfer manner limited by the transfer limiting portion allows transfer of each of the simultaneously selected operational elements only along a straight line connecting a given base point on the display unit with the simultaneously selected operational element; and the transfer state is a rate of expansion or contraction of a distance between the base point and each of the simultaneously selected operational elements compared before and after transfer of the simultaneously selected operational element along the straight line. Furthermore, the parameter generating apparatus further includes a linear supplemental line display portion (SP40) for displaying, on the display unit, a linear supplemental line (232 through 246) along the straight line.

In addition, the transfer manner limited by the transfer limiting portion allows transfer of each of the simultaneously selected operational elements only along a circumference passing through the simultaneously selected operational element with a given base point on the display unit centered thereon; while the transfer state indicates a rotation angle by which the simultaneously selected operational elements rotate along the circumference. The parameter generating apparatus further include a circular supplemental line display portion (SP60) for displaying, on the display unit, a circular supplemental line (252 through 266) along the circumference.

In addition, the transfer limiting portion selects as the limited transfer manner, on condition that a given first limiting operation (depressing of Ctrl key) is performed, a first transfer manner which allows each of the simultaneously selected operational elements to transfer only along a straight line connecting a given base point on the display unit with the selected operational element, and selects as the limited transfer manner, on condition that a given second limiting operation (depressing of Alt key) is performed, a second transfer manner which allows each of the selected operational elements to transfer only along a circumference passing through the simultaneously selected operational element with the base centered thereon. The transfer determining portion (SP76, SP88, SP92) selects as the transfer state, when the first limiting operation (depressing of Ctrl key) is performed, a rate of expansion or contraction of a distance between the base point and each of the simultaneously selected operational elements compared before and after transfer of the simultaneously selected operational element along the straight line (SP76), and selects as the transfer state, when the second limiting operation (depressing of Alt key) is performed, a rotation angle by which the simultaneously selected operational elements rotate along the circumference (SP88). The parameter generating apparatus further includes a supplemental line display portion (SP40, SP60) for displaying on the display unit, when the first limiting operation (depressing of Ctrl key) is performed, a linear supplemental line (232 through 246) along the straight line, and displaying on the display unit, when the second limiting operation (depressing of Alt key) is performed, a circular supplemental line (252 through 266) along the circumference.

Furthermore, the parameter generating apparatus further includes a determination portion for determining whether the simultaneously selected operational elements include the sound receiving point image (212); a first base point selecting portion (SP36, SP56) for selecting, on condition that a positive determination is made by the determination portion, a central point (240) of the acoustic space image (204) as the base point; and a second base point selecting portion (SP38, SP58) for selecting, on condition that a negative determination is made by the determination portion, the sound receiving point image (212) as the base point.

According to the third feature, in response to the instruction for transferring one of the selected operational elements, the transfer state for all the selected operational elements is determined on the basis of the instruction of transfer and the limited transfer manner. As a result, the third feature enables the user to simultaneously modify the arrangement of the elements in the acoustic space with a simple operation.

Furthermore, the present invention can be embodied not only as an invention of the data processing apparatus and the parameter generating apparatus but also as an invention of a computer program and a method applied to the apparatuses.

DESCRIPTION OF THE PREFERRED EMBODIMENT

1. Overview of Embodiment

1.1 Correlation between Position of Elements and Sound

Figure 1A:
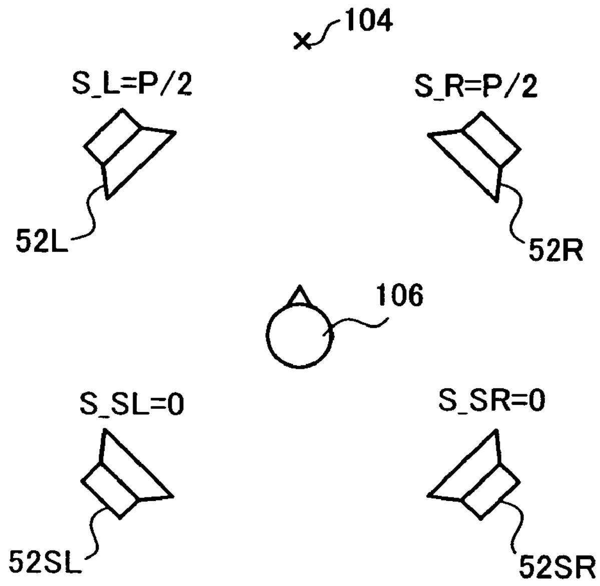
FIG. 1A is an explanatory drawing of the operation of a conventional audio editing system.
Figure 1B:
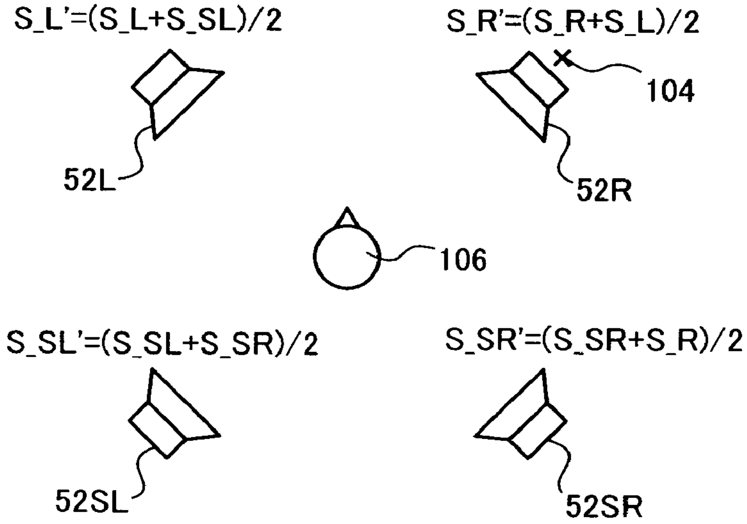
FIG. 1B is an explanatory drawing indicative of a case in which audio signals of the audio editing system shown in FIG. 1A are rotated 45 degrees to the right.
Figure 2:
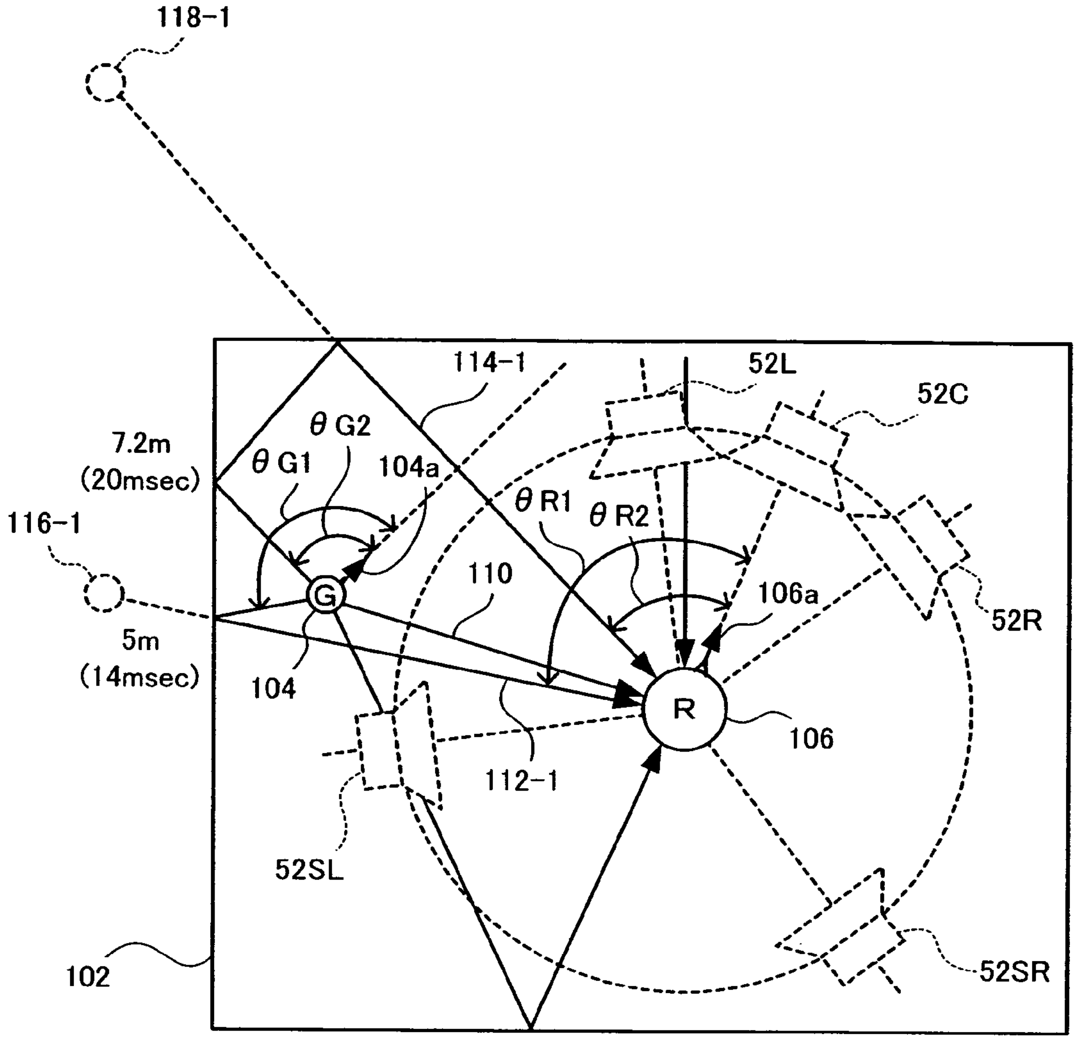
FIG. 2 is an explanatory drawing indicative of the principle of operation of an audio editing system according to an embodiment of the present invention.

Assume that, in FIG. 2, a sound emitting point 104 and a sound receiving point 106 are placed in a rectangular parallelepipedic acoustic space 102. A direct sound reaches the sound receiving point 106 from the sound emitting point 104 along a sound path (a path along which sounds propagate) 110. Along a sound path 112-1, in addition, a first reflected sound (a sound reflected off a wall surface of the acoustic space 102 only once) reaches the sound receiving point 106. The total number of sound paths for first reflected sounds is six, that is to say, the same number as that of the wall surfaces which form the rectangular parallelepipedic acoustic space 102. In addition to the sound path 112-1, namely, there are five more sound paths (not shown).

In addition, a second reflected sound travels along a sound path 114-1. The total number of sound paths for second reflected sounds is eighteen. In addition to the sound path 114-1, namely, there are seventeen more sound paths (not shown). The way to determine the number of sound paths for second reflected sounds is described in detail in the above-cited Japanese Patent Laid-Open Publication No. 2004-212797. Although there exist third and later reflected sounds, they will be ignored. Each reflection of a sound off a wall surface causes attenuation and changes in frequency characteristics (filtering) of the sound. Assuming that the wall surfaces of the acoustic space 102 are made of mirror, mirror images 116-1, 118-1 of the sound emitting point 104 reflected on the mirror can be obtained.

Figure 3:
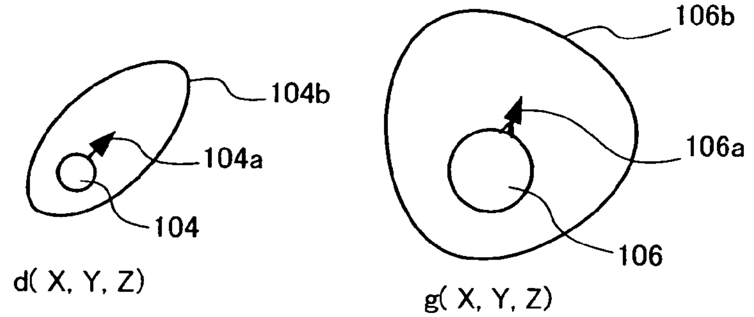
FIG. 3 is an example of directional characteristics of a sound emitting point 104 and a sound receiving point 106.

These mirror images are at a distance from the sound receiving point 106, the distance being equal to the length of their respective corresponding solid-lined sound paths. Each of the mirror images has an angle with respect to the sound receiving point 106, the angle being equal to the incident angle of its corresponding sound path with respect to the sound receiving point 106. The number of the mirror images is equal to that of sound paths for reflected sounds. In the present embodiment, in addition, directivity is imparted to the sound emitting point 104 and the sound receiving point 106. In FIG. 2, the front side of the points 104, 106 is shown by arrows 104*a*, 106*a*, respectively. In FIG. 3 there are shown examples of directivity 104*b*, 106*b* of the sound emitting point 104 and the sound receiving point 106. Take the angle of a sound path radiating from the sound emitting point 104 relative to the front side 104*a* of the sound emitting point 104 as a radiating angle θG, and the angle of the sound path entering the sound receiving point 106 relative to the front side 106*a* of the sound receiving point 106 as an entering angle θR. In FIG. 2, the radiating angle and the entering angle of the sound paths 112-1, 114-1 are shown as θG1, θG2 and θR1, θR2, respectively.

Delivered to the sound receiving point 106 along the respective sound paths are audio signals emitted from the sound emitting point 104, the signals undergoing following attenuation and filtering processes:

(1) attenuation process of multiplying by an attenuation coefficient Zlen inversely proportional to the second power of the length of a sound path (2) filtering process of multiplying by a filtering characteristic Zref on a reflecting surface for the number of reflections (3) attenuation process of multiplying by an attenuation coefficient ZG based on the directivity 104*b* and the radiating angle θG (4) attenuation process of multiplying by an attenuation coefficient ZR based on the directivity 106*b* and the entering angle θR.

The thus obtained audio signals delivered along the respective sound paths are assigned to channels for the use of reproduction. In the present embodiment, taken as reproduction system is a 5.1 surround system. In the reproduction system, assume that a center speaker 52C, right and left speakers 52R, 52L, and right and left surround speakers 52SR, 52SL are placed on the circumference of a circle of 2.5 m radius with a listener centered thereon. The center speaker 52C is located at the front of the listener. The right and left speakers 52R, 52L are located at both sides of the center speaker 52C, each spaced apart by 30 degrees from the center speaker 52C. The right and left surround speakers 52SR, 52SL are also located at both sides of the center speaker 52C, each spaced apart by 120 degrees from the center speaker 52C. The location of the speakers are shown by broken lines in FIG. 2. Although the 5.1 surround system also includes a sub-woofer, the sub-woofer is not shown because it is not involved in localization.

Figure 4:
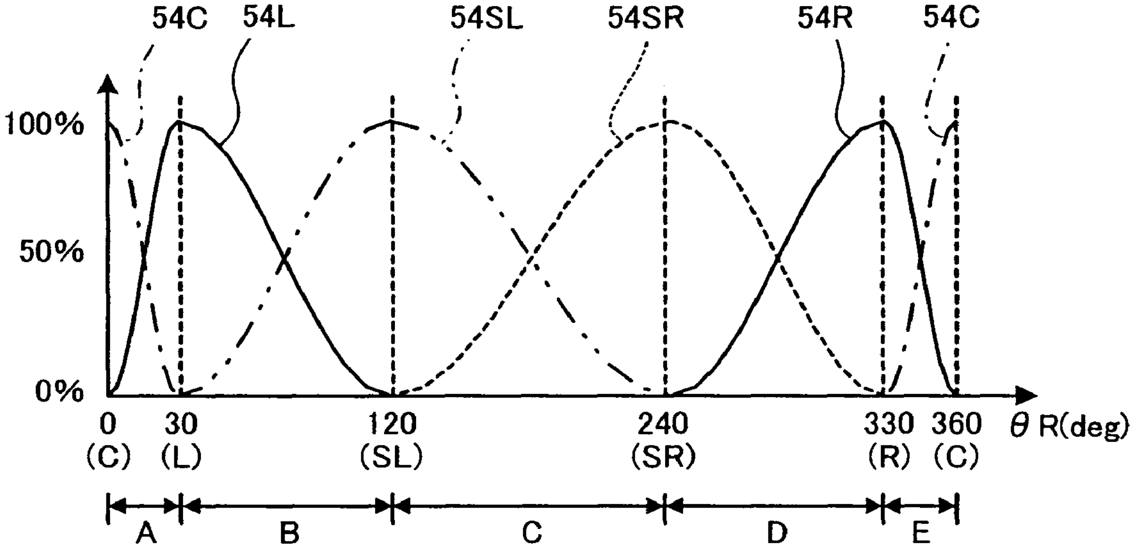
FIG. 4 is a diagram showing distribution characteristics of an audio signal in the embodiment.

Audio signals of respective channels to be supplied to these speakers 52C, 52L, 52R, 52SR, 52SL are referred to as S_C, S_L, S_R, S_SR, S_SL, respectively. Shown in FIG. 4 is the ratio for distributing audio signals on a sound path among the channels. In FIG. 4, distribution characteristics 54C, 54L, 54R, 54SR, 54SL, each of which is the function of an entering angle θR, are the distribution ratio provided for the audio signals S_C, S_L, S_R, S_SR, S_SL, respectively, for distributing audio signals on the respective sound path. Each of sections A to E shown in FIG. 4 has only two channels having the distribution ratio of 0% or more at one time, the total of the distribution ratio of the two channels being 100%. At the boundary between the respective sections A to E, one channel has the distribution ratio of 100% while the other channels have the distribution ratio of 0%.

As described above, according to the present embodiment, an audio signal delivered along the respective sound paths is distributed into the audio signals S_C, S_L, S_R, S_SR, S_SL so that the listener can hear a sound from the direction of an entering angle θR. The resultant multi-channel audio signals are generated as audio signals adapted toward the sound receiving point 106. Therefore, the present embodiment eliminates the need for further turning the sound field of the multi-channel audio signals, requiring less calculation for achieving sharp localization of sound images.

1.2. User Interface

In the present embodiment, distribution of an audio signal among the five channels that compose the above-described surround system is performed on a digital mixer, whereas settings of the acoustic space 102, the sound emitting point 104, the sound receiving point 106 and the like are established on a screen of a personal computer. Hereafter the user interface on a setting screen of the personal computer will be described.

Figure 5:
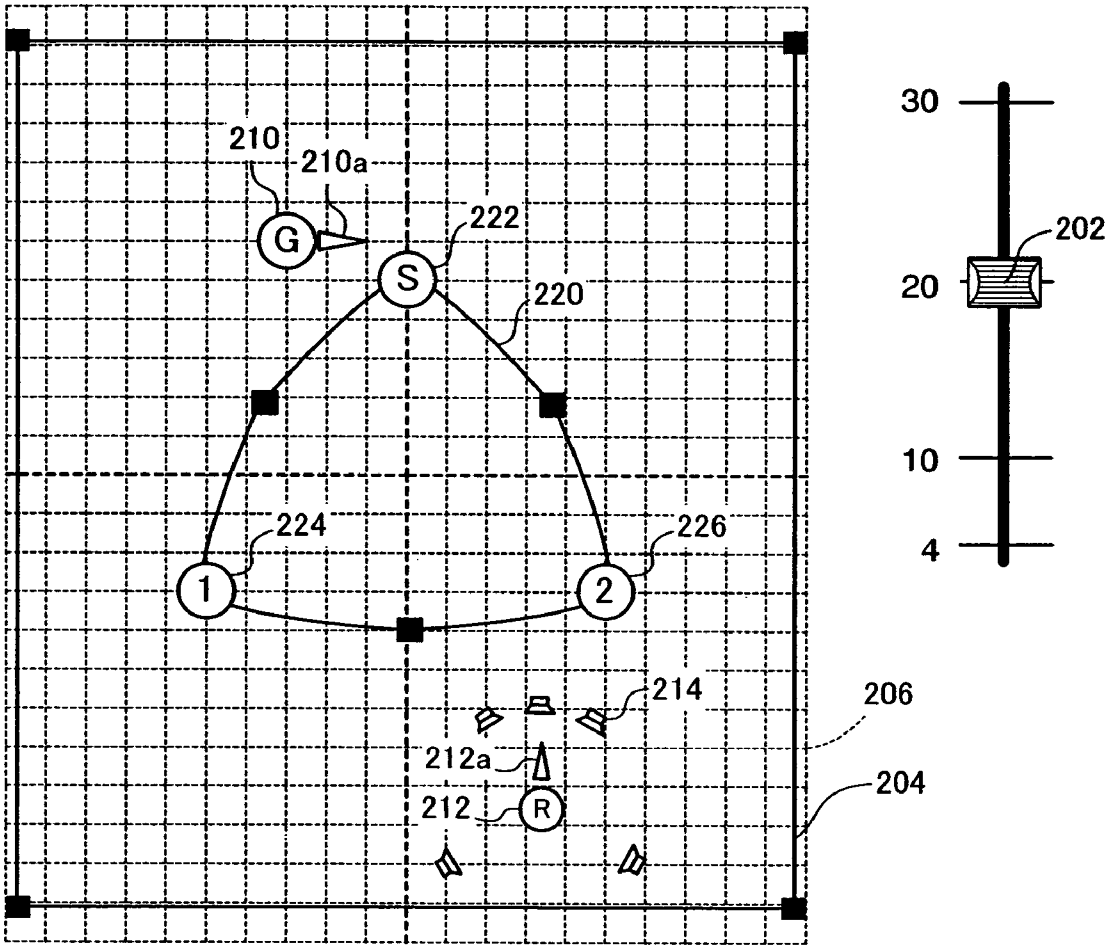
FIG. 5 is a diagram showing an example of a setting screen displayed on a display unit 34.

An example setting screen is shown in FIG. 5. Sectional lines 206 are formed of broken lined square boxes that are continuously arranged in rows and columns. In the shown example, each box corresponds to "1 m by 1 m" in the acoustic space 102. An acoustic space outline 204 represents side wall surfaces of a simulated rectangular parallelepiped acoustic space. A zoom fader 202 is used for specifying the zoom level of a display screen. The zoom level corresponds to the number of boxes arranged in row, the boxes indicated by the sectional lines 206. In the shown example, the zoom level is set at "20". The position of the side wall surfaces forming the acoustic space outline 204 and the operating position of the zoom fader 202 can be arbitrarily moved by dragging them with a mouse.

Inside of the acoustic space outline 204, a sound emitting point image 210 indicates the position of the sound emitting point 104. A sound emitting point orientation image 210*a* indicates the front of the sound emitting point 104. A sound receiving point image 212 indicates the position of the sound receiving point 106. A sound receiving point orientation image 212*a* indicates the front of the sound receiving point 106. A speaker image 214 is formed of images of the speakers 52C, 52L, 52R, 52SR, 52SL, arranged on the circumference of a circle of 2.5 m radius with the sound receiving point image 212 centered thereon. As a reproduction system, similarly to FIG. 2, speakers of a 5.1 surround system are intended to be arranged. In addition, the speaker image 214 is arranged such that the image of the center speaker 52C is placed toward the sound receiving point orientation image 212*a*. The arrangement of the speaker image 214 relative to the sound receiving point image 212 and the sound receiving point orientation image 212*a* is constantly maintained in spite of a change in the location or orientation of the sound receiving point 106.

The sound emitting point image 210 and the sound receiving point image 212 can be moved by a user's drag-and-drop with a mouse to any position inside the acoustic space outline 204. The move of the sound emitting point image 210 or the sound receiving point image 212 also causes a move of the sound emitting point orientation image 210*a* or the sound receiving point orientation image 212*a*. In addition, the orientation of the sound emitting point orientation image 210*a* and the sound receiving point orientation image 212*a* can be arbitrarily changed by a user's drag-and-drop with a mouse. However, the orientation images 210*a*, 212*a* are allowed to move only on the circumference of a circle of a given radius with the sound emitting point image 210 and the sound receiving point image 212 centered thereon, respectively. In addition, the orientation images 210*a*, 212*a* can be oriented only in the radial direction of the sound emitting point image 210 and the sound receiving point image 212, respectively.

Figure 6:
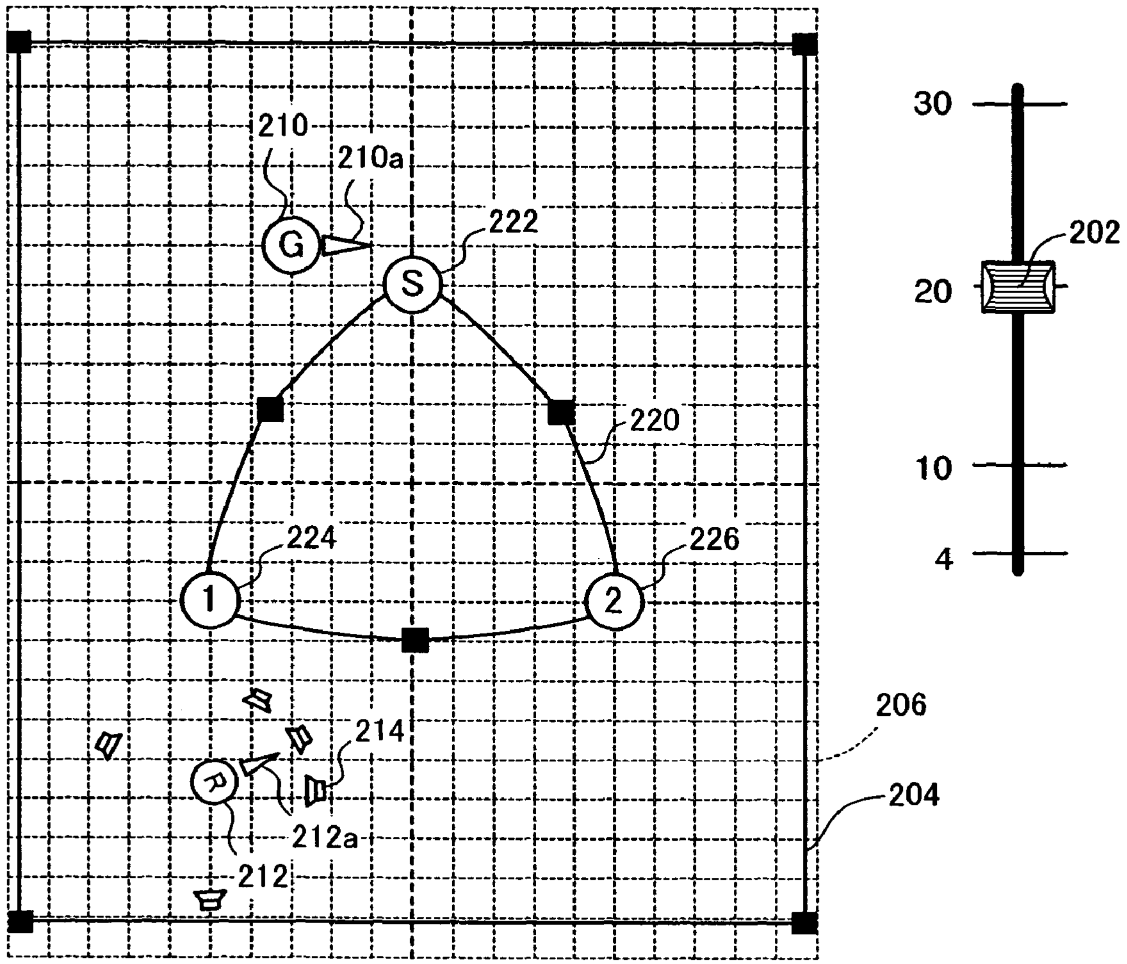
FIG. 6 is a diagram showing another example of the setting screen.

Shown in FIG. 6 indicative of a setting screen is a state where the sound receiving point image 212 is moved slightly to the left on the screen with the sound receiving point orientation image 212*a* being turned slightly to the right. Since the speaker image 214 is automatically determined on the basis of the position of the sound receiving point image 212, the orientation of the sound receiving point orientation image 212*a* and the zoom level of the zoom fader 202, the speaker image 214 moves in accordance with the sound receiving point image 212 and turns in accordance with the sound receiving point orientation image 212*a* as shown in FIG. 6.

The position of the sound emitting point image 210 and the orientation of the sound emitting point orientation image 210*a* can also be changed by a drag-and-drop operation with a mouse. However, a "course" is previously provided for the sound emitting point image 210 and the sound emitting point image 210 can be automatically moved along the course. A course line 220 indicates a course along which the sound emitting point image 210 moves. Course point images 222, 224, 226 are points for identifying the course line 220. More specifically, the course line 220 is determined by lines (straight lines or curved lines) interconnecting the course point images 222, 224, 226. The course point images 222, 224, 226 can also be arbitrarily moved by a drag-and-drop operation with a mouse.

Figure 7:
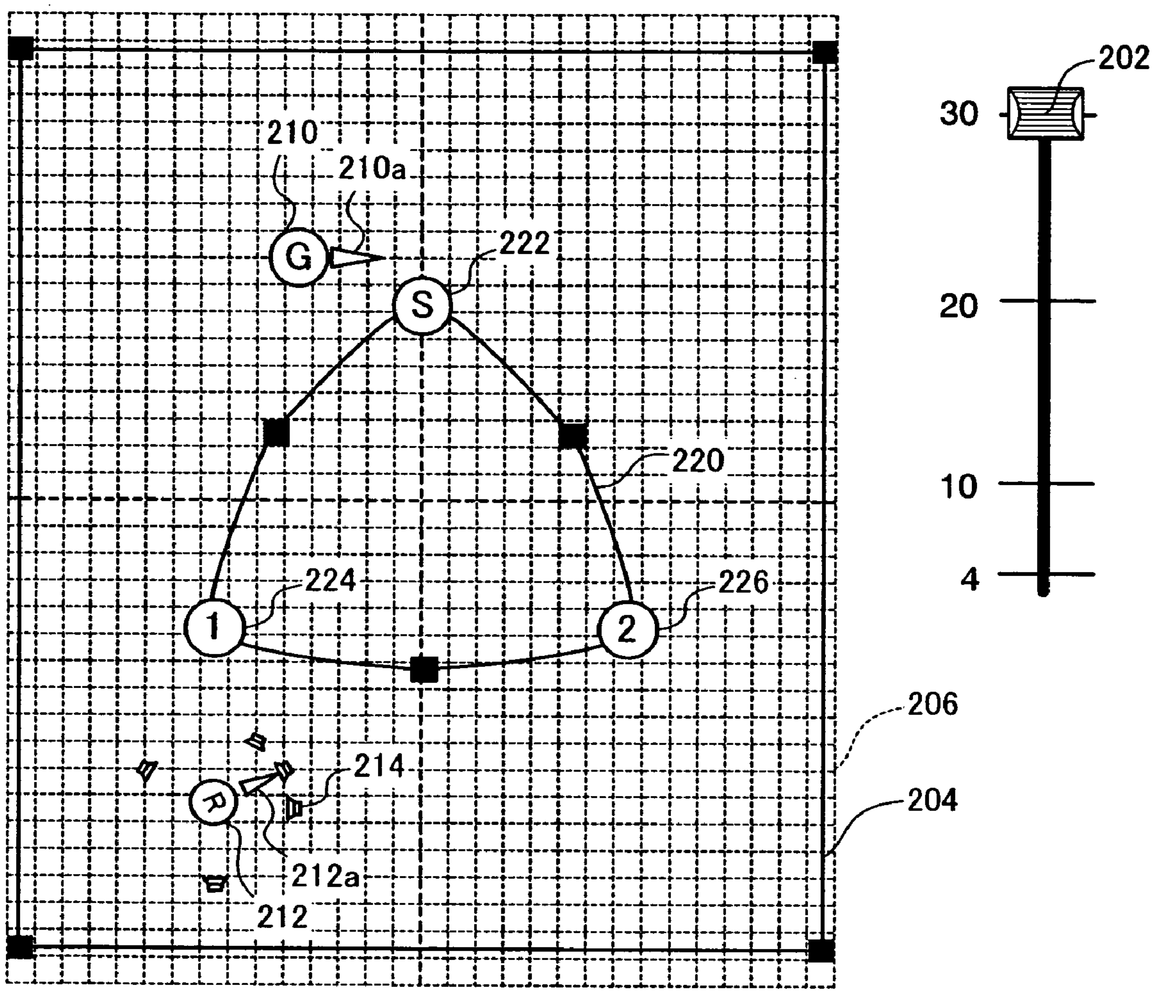
FIG. 7 is a diagram showing still another example of the setting screen.

Shown in FIG. 7 is a state where the zoom fader 202 is operated to change the zoom level to "30" in the setting screen of FIG. 6. Apparently, the sectional lines 206 in FIG. 7 are dense compared to FIG. 6, indicating that the displayable area of the setting screen increases. When compared to FIG. 6, however, the setting screen of FIG. 7 has no change in the size and the position of the acoustic space outline 204 and the displayed position of the sound emitting point image 210, the sound receiving point image 212, the course point images 222, 224, 226 and the course line 220. However, since the speaker image 214 is plotted on the circumference of a circle of 2.5 m radius on the sectional lines 206, the speaker image 214 is displayed smaller than that of FIG. 6.

Figure 8:
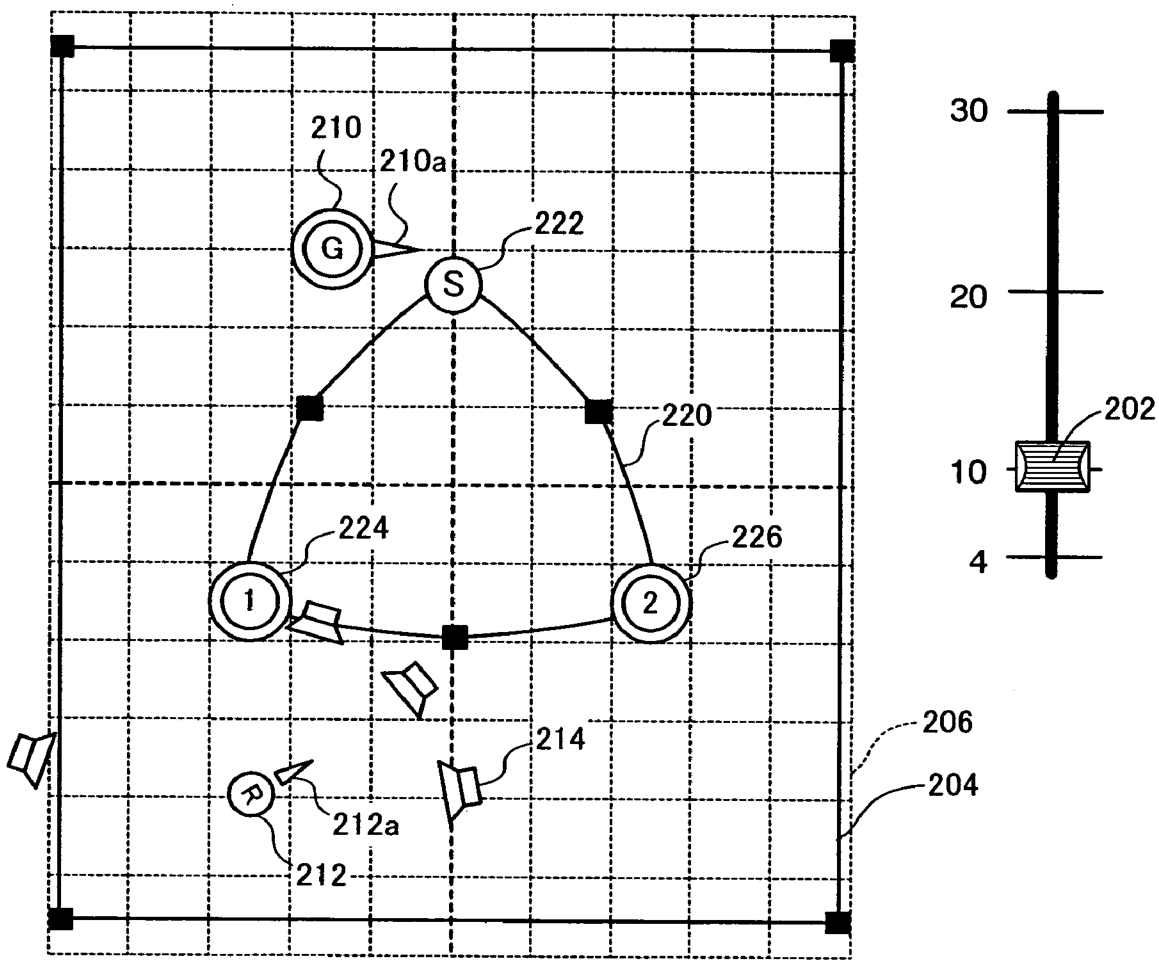
FIG. 8 is a diagram showing a further example of the setting screen.

Shown in FIG. 8 is a state in which the setting screen shown in FIG. 6 or FIG. 7 is modified such that the zoom fader 202 is operated to change the zoom level to "10". Apparently, the spacing between the sectional lines 206 in FIG. 8 is wide compared to FIG. 6, indicating that the displayable area of the setting screen decreases. When compared to FIG. 6, however, the setting screen of FIG. 8 has no change in the size and the position of the acoustic space outline 204 and the displayed position of the sound emitting point image 210, the sound receiving point image 212, the course point images 222, 224, 226 and the course line 220. Compared to FIG. 6, however, the speaker image 214 is enlarged.

In other words, the zoom fader 202 in the present embodiment is used not only for merely changing the display state (scale) of a setting screen but also for zooming in or out the entire acoustic space with the relative positional relationship between respective elements placed within the simulated acoustic space being maintained. Such change in display state of the sectional lines 206 and the speaker images 214 made by the operation of the zoom fader 202 enables the user to intuitively grasp the size of the acoustic space and the position of respective elements in comparison to the assumed listening room (approximately 5 m by 5 m).

Since the sound emitting point image 210, the sound emitting point orientation image 210*a*, the sound receiving point image 212, the sound receiving point orientation image 212*a*, and the course point images 222, 224, 226 are elements whose position is arbitrarily specified by user's mouse operation, they will be referred to as "operational elements". A user's mouse-click on any of the operational elements places the clicked element in a "selected state". More specifically, a mouse-click on an operational element in a normal state resets all the operational elements that have been in the selected state back to non-selected state, and sets only the clicked operational element to the selected state.

In a state where a Shift key on the keyboard of a personal computer is kept depressed, in addition, a plurality of operational elements can be set to the selected state. In a state where a Shift key is kept depressed, furthermore, if an operational element that is in the selected state is clicked with a mouse, the operational element is reset to non-selected state. In this case, the other operational elements are kept as they are. However, the sound emitting point orientation image 210*a* and the sound receiving point orientation image 212*a* can be in the selected state by itself but cannot be in the selected state in conjunction with any other operational element.

In later figures, operational elements in the selected state will be indicated by a double circle. In the example shown in FIG. 8, the sound emitting point image 210, the course point image 224 and the course point image 226 are set at the selected state. In a state where a plurality of operational elements are in the selected state, if any of the selected operational elements undergoes an drag-and-drop operation, the position of all the selected operational elements on the screen moves in accordance with the drag-and-drop operation with the relative positional relationship of all the operational elements in the selected state being maintained.

Figure 9:
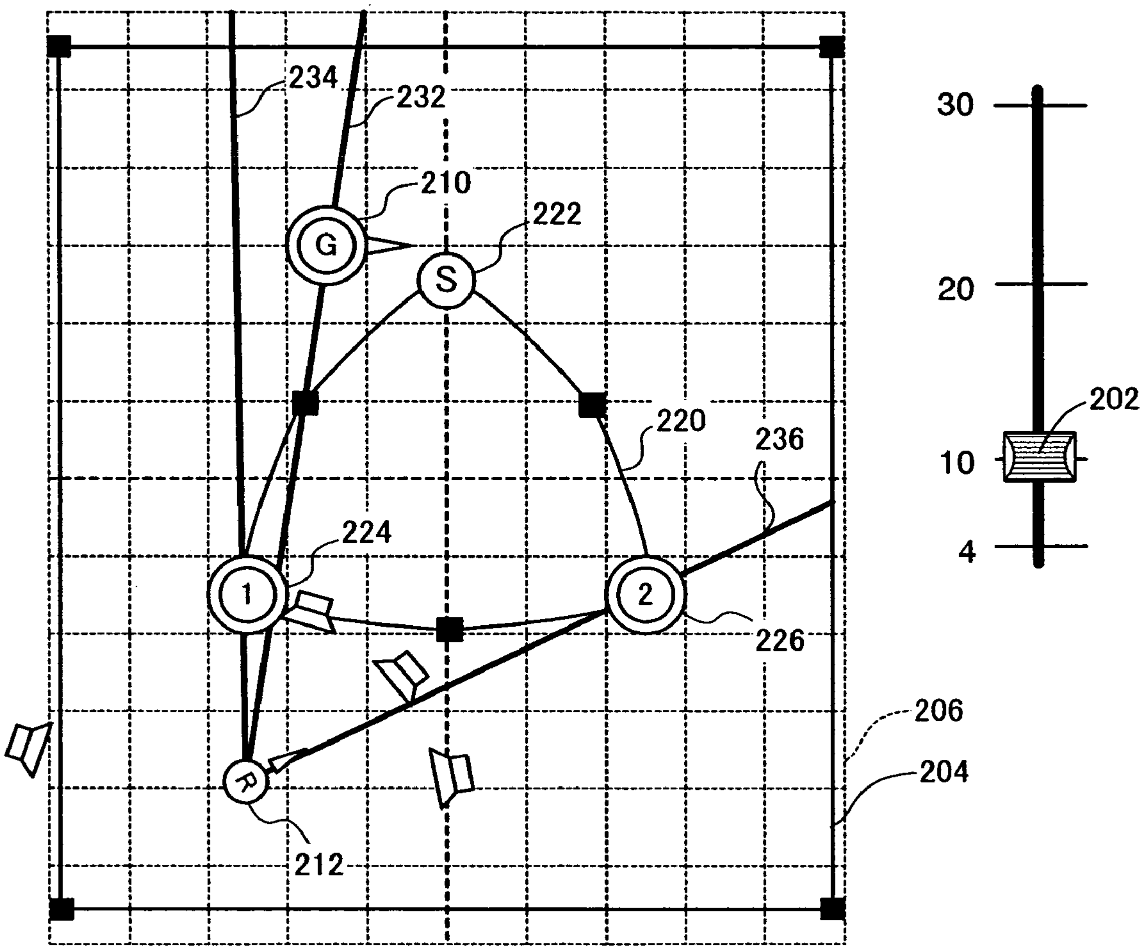
FIG. 9 is a diagram showing a still further example of the setting screen.

If a Ctrl key on the keyboard is depressed in a state where one or more operational elements are in the selected state, a "linear supplemental line" is provided for the respective selected operational elements and displayed on the screen. Shown in FIG. 9 is a screen in which a Ctrl key is depressed on the screen shown in FIG. 8 to show linear supplemental lines. A linear supplemental line is a straight line connecting a "base point" with an operational element that is in the selected state. When the sound receiving point image 212 is not in the selected state, the "base point" is the sound receiving point image 212. When the sound receiving point image 212 is in the selected state, on the other hand, the "base point" is the center of the acoustic space outline 204. In the example of FIG. 9, since the sound receiving point image 212 is not in the selected state, the sound receiving point image 212 is defined as the base point with linear supplemental lines 232, 234, 236 being provided as straight lines connecting the sound receiving point image 212 with the operational elements 210, 224, 226.

In a case where linear supplemental lines are drawn as described above, respective operational elements in the selected state are allowed to move only on their corresponding linear supplemental line. More specifically, if an operational element is dragged and dropped with a mouse, coordinates of a point on the linear supplemental line is sought, the point being located at the nearest position from the dropped position. The operational element then moves to the sought point. In a case where a plurality of operational elements are in the selected state with their linear supplemental lines being drawn on a screen, if any of the selected operational elements is required to move by a drag-and-drop operation, the rate of expansion or contraction of the distance between the base point and the operational element is sought to move the other selected elements by a distance that achieves the sought rate of expansion or contraction.

In the scale of the sectional lines 206 in FIG. 9, for example, the distance from the base point (the sound receiving point image 212) to the sound emitting point image 210, the course point image 224, and the course point image 226 is "7 m", "2.5 m", and "5.5 m", respectively. Suppose the sound emitting point image 210 is moved to the distance of "9 m" from the base point by a drag-and-drop operation. In this case, the rate of expansion or contraction of the distance to the sound emitting point image 210 is "9/7", resulting in the course point image 224 moving on the linear supplemental line 234 to be located at the distance of approximately "3.2 m" from the base point, and the course point image 226 moving on the linear supplemental line 236 to be located at the distance of approximately "6.4 m" from the base point. In the cases as described above where any of the three course point images 222, 224, 226 is moved, the shape of the course line 220 is also changed in accordance with the move.

Figure 10:
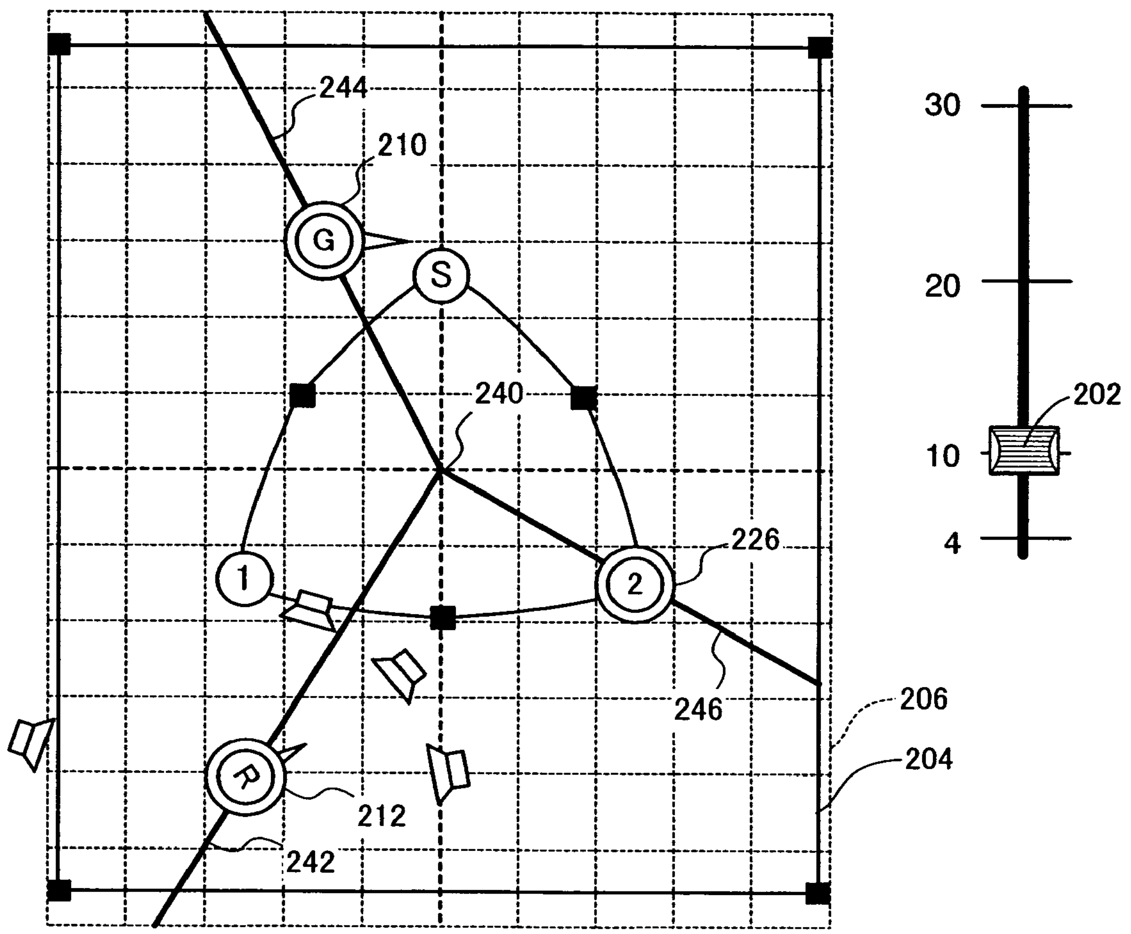
FIG. 10 is a diagram showing another example of the setting screen.

Shown in FIG. 10 is a modification of FIG. 9 such that the selection of the course point image 224 is canceled with the sound receiving point image 212 being set to the selected state instead. In a case where the sound receiving point image 212 is in the selected state, as shown in FIG. 10, a central point 240 of the acoustic space outline 204 is defined as the base point with linear supplemental lines 242, 244, 246 being drawn as the straight lines connecting the base point and the selected operational elements 212, 210, 226, respectively. Although the base point is replaced, and so are the linear supplemental lines in FIG. 10, the operational elements behave similarly to those shown in FIG. 9.

Figure 11:
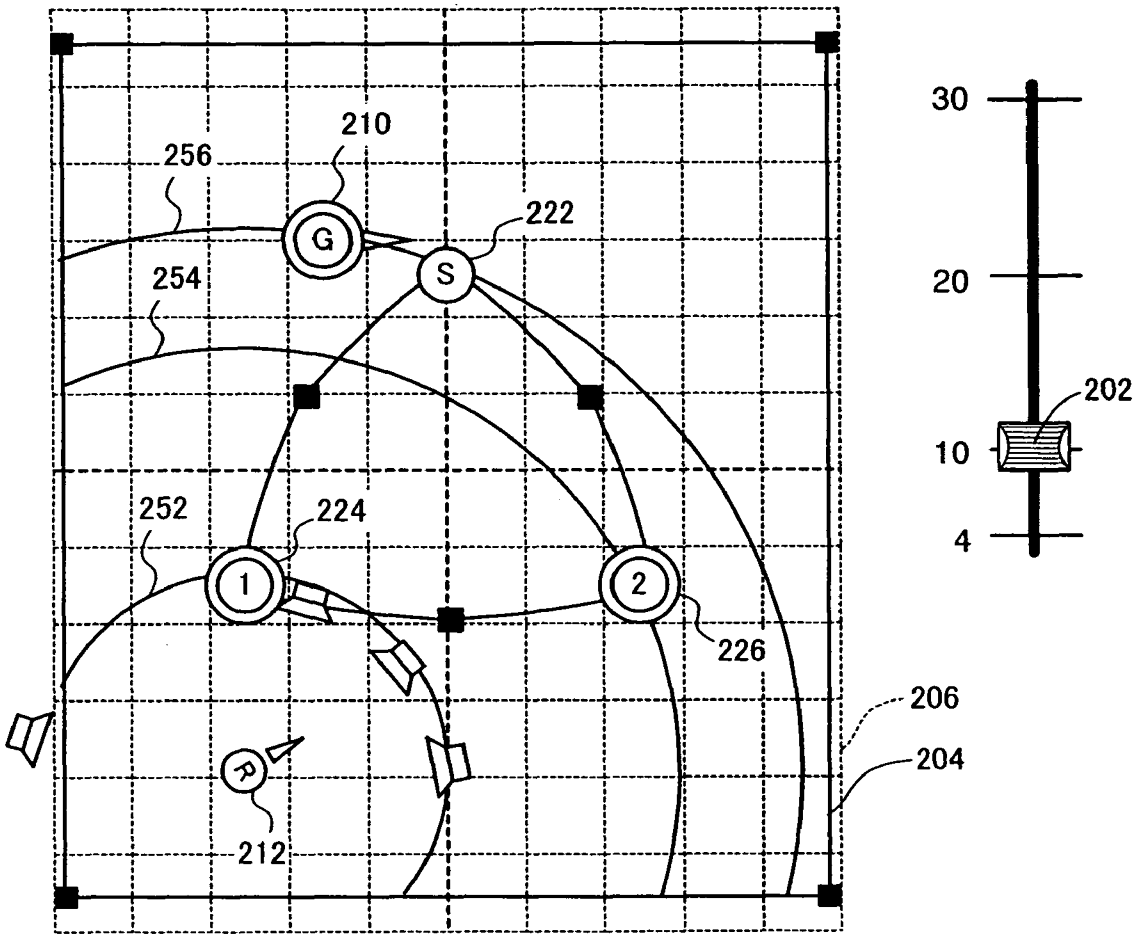
FIG. 11 is a diagram showing an additional example of the setting screen.

If an Alt key on the keyboard is depressed in a state where one or more operational elements are in the selected state, a "circular supplemental line" is provided for the respective selected operational elements and displayed on the screen. Shown in FIG. 11 is a screen in which an Alt key is depressed on the screen shown in FIG. 8 to show circular supplemental lines. A circular supplemental line is a circle or an arc passing through an operational element that is in the selected state with a "base point" centered thereon. When the sound receiving point image 212 is not in the selected state, similarly to the case of the linear supplemental line, the "base point" is the sound receiving point image 212. When the sound receiving point image 212 is in the selected state, on the other hand, the "base point" is the center of the acoustic space outline 204. In the example of FIG. 11, since the sound receiving point image 212 is not in the selected state, the sound receiving point image 212 is defined as the base point with circular supplemental lines 252, 254, 256 being provided as circles each passing through the operational elements 224, 226, 210, respectively, the center of the circles being the base point.

In a case where circular supplemental lines are drawn as described above, respective operational elements in the selected state are allowed to move only along their corresponding circular supplemental line. More specifically, if an operational element is dragged and dropped with a mouse, coordinates of a point on the circular supplemental line is sought, the point being located at the nearest position from the dropped position. The operational element then moves to the sought point. In a case where a plurality of operational elements are in the selected state with their circular supplemental lines being drawn on a screen, if any of the selected operational elements is required to move by a drag-and-drop operation, the rotation angle measured from the base point is sought. The other selected elements are then moved such that they rotate the sought rotation angle on their corresponding circular supplemental line.

Figure 12:
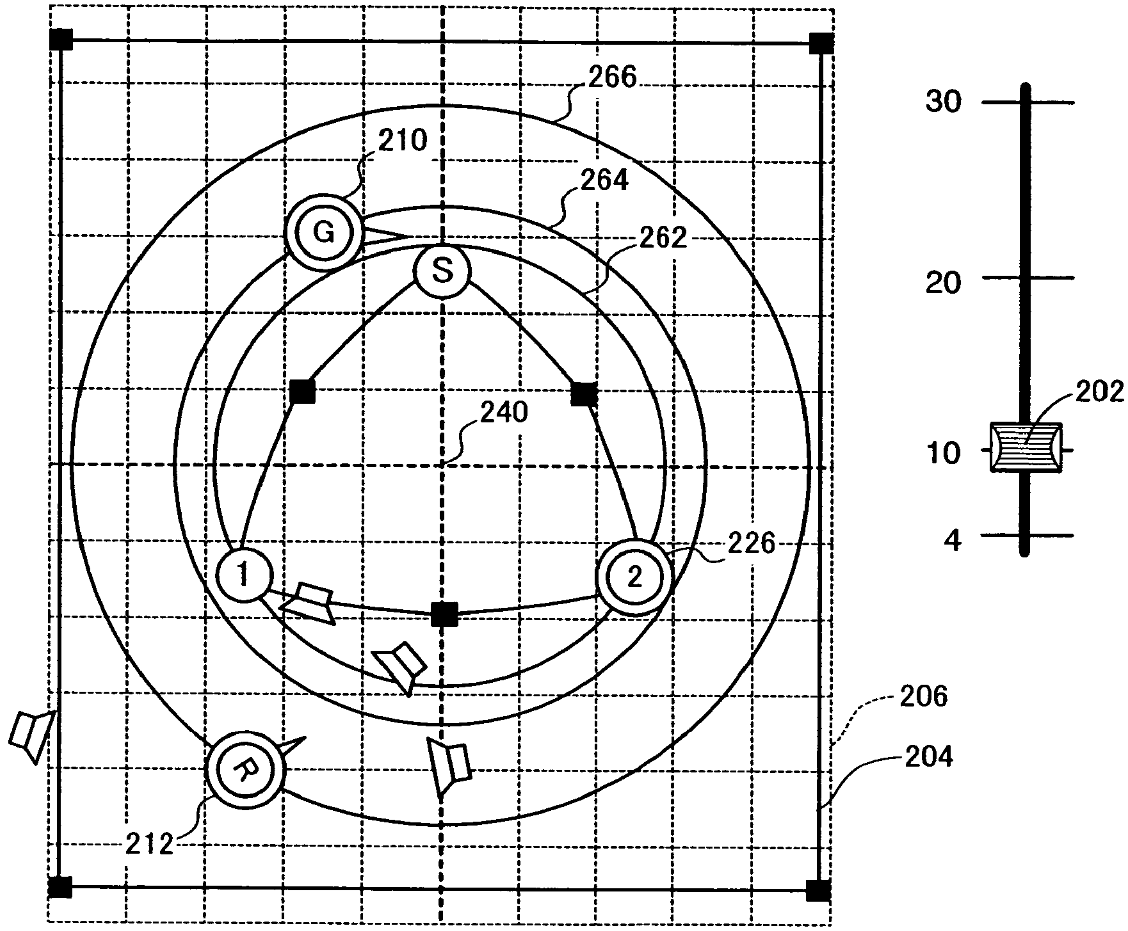
FIG. 12 is a diagram showing an even further example of the setting screen.

Shown in FIG. 12 is a modification of FIG. 11 such that the selection of the course point image 224 is canceled, and the sound receiving point image 212 is in the selected state instead. In a case where the sound receiving point image 212 is in the selected state, as shown in FIG. 12, the central point 240 of the acoustic space outline 204 is defined as the base point with circular supplemental lines 262, 264, 266 being drawn as the circles each passing through the selected operational elements 226, 210, 212, respectively, the center of the circles being the base point. Although the base point is replaced, and so are the circular supplemental lines in FIG. 12, the operational elements behave similarly to those shown in FIG. 11.

2. Hardware Configuration of the Embodiment

Figure 13:
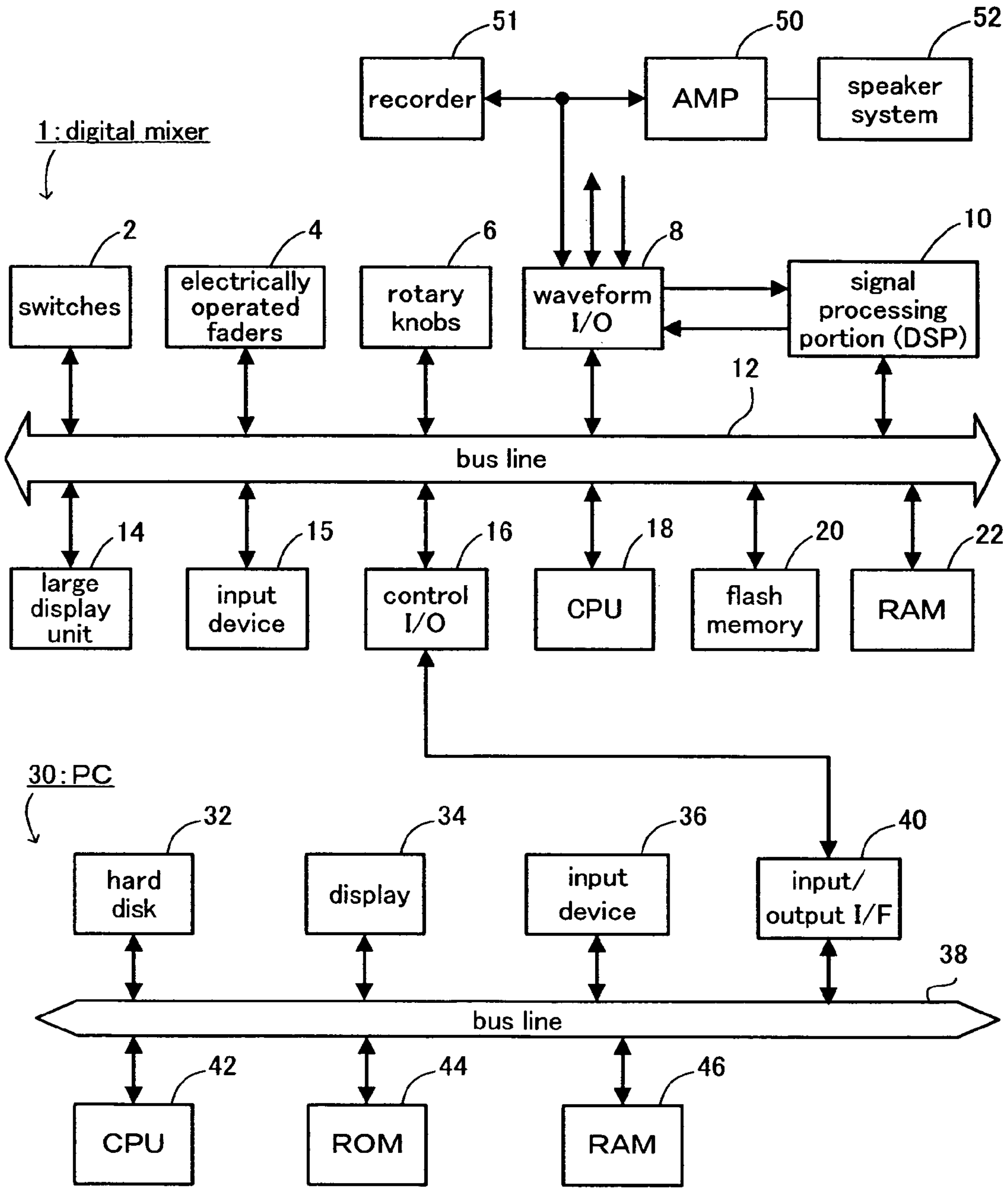
FIG. 13 is a block diagram showing hardware of the audio editing system of the embodiment.

The hardware configuration of the audio editing system in the embodiment of the present invention will now be described with reference to FIG. 13. The audio editing system is composed of a multi-track recorder 51 for recording/reproducing audio signals, control signals, and the like, a digital mixer 1 for mixing audio signals, a personal computer 30 for establishing settings of the mixing, and an amplifier 50 and a speaker system 52 for reproducing edited audio signals.

In the digital mixer 1, electrically operated faders 4 control the signal level of respective input/output channels in accordance with user's operation. The electrically operated faders 4 are configured such that the operational position of the electrically operated faders 4 is automatically set in accordance with an operational command supplied through a bus line 12. Switches 2 are composed of various switches and LED keys. The switching on/off an LED contained in the respective LED keys is specified through the bus line 12. Rotary knobs 6 are used for specifying the right and left loudness balance of the respective input/output channels.

A waveform I/O portion 8 inputs/outputs analog audio signals or digital audio signals. In the present embodiment, in a case where an audio signal emitted from the sound emitting point 104 has been recorded in any track of the multi-track recorder 51, for example, the audio signal will be input through the waveform I/O portion 8. Furthermore, respective audio signals forming the 5.1 surround system are supplied through the waveform I/O portion 8 to the multi-track recorder 51 to be recorded, the audio signals being synthesized in the digital mixer 1. The respective audio signals forming the 5.1 surround system are converted into analog signals at the waveform I/O portion 8 and then emitted through the amplifier 50 and the speaker system 52.

A signal processing portion 10 is composed of a group of DSP (digital signal processor). The signal processing portion 10 mixes digital audio signals supplied through the waveform I/O portion 8 or adds an effect to the supplied digital audio signals, and outputs the resultant signals to the waveform I/O portion 8. A large display unit 14 displays various information for a user. An input device 15, which is composed of various operators provided on an operating panel, a keyboard, a mouse and the like, is used for moving a cursor on the large display unit 14, turning on/off buttons displayed on the large display unit 14, and the like. A control I/O portion 16 inputs/outputs various control signals to/from the personal computer 30 or the like. A CPU 18 controls these portions through the bus line 12 in accordance with a control program stored in a flash memory 20. A RAM 22 is used as a work memory of the CPU 18.

In the personal computer 30, a hard disk 32 stores an operating system, various application programs and the like. A display unit 34 displays various information for the user. An input device 36 is composed of a keyboard for inputting characters, a mouse, etc. An input/output interface 40 inputs/outputs various control signals from/to the control I/O portion 16 of the digital mixer 1. A CPU 42 controls other components of the personal computer 30 through a bus 38. A ROM 44 stores an initial program loader, etc. A RAM 46 is used as a work memory of the CPU 42.

3. Operation of the Embodiment 3.1 Algorithm of the Digital Mixer 1

In the digital mixer 1, as described above, when an audio signal emitted from the sound emitting point 104 is input from the multi-track recorder 51, the signal processing portion 10 considers the signal as an input audio signal Si and generates, on the basis of the input audio signal Si, audio signals S_C, S_L, S_R, S_SR, S_SL for five channels. A mixing algorithm performed on the signal processing portion 10 will be explained with reference to FIG. 14A.

Figure 14A:
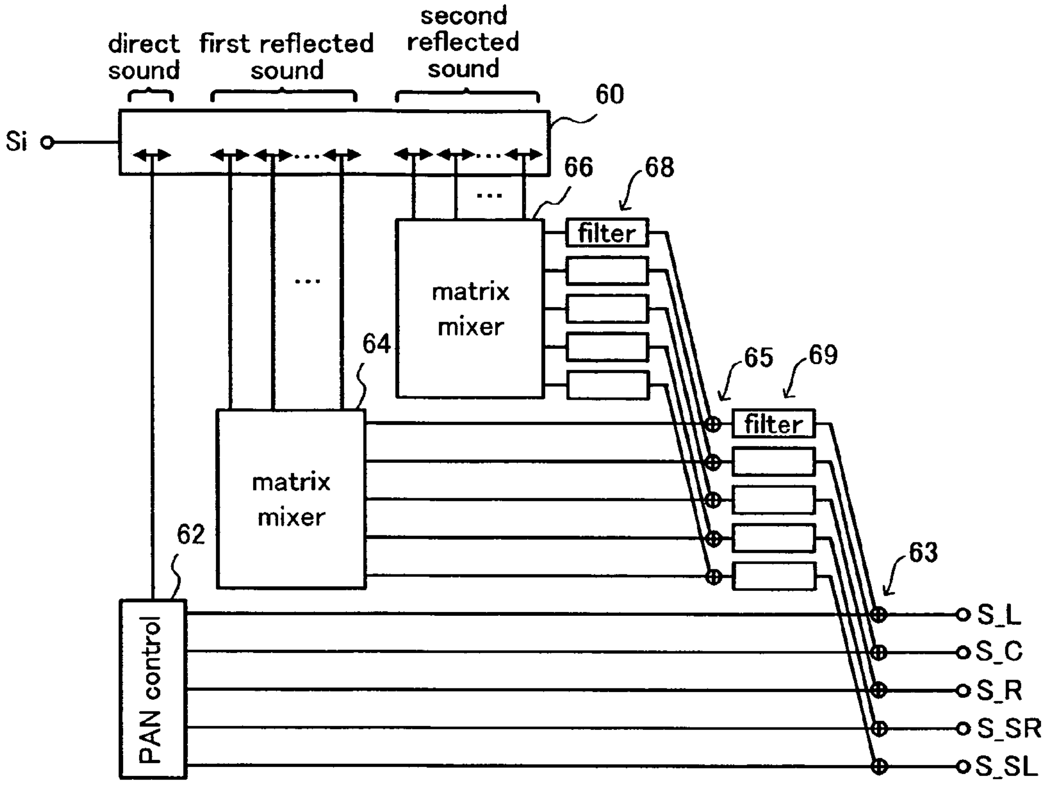
FIG. 14A is a block diagram indicative of an algorithm of processing executed by a signal processing portion 10.
Figure 14B:
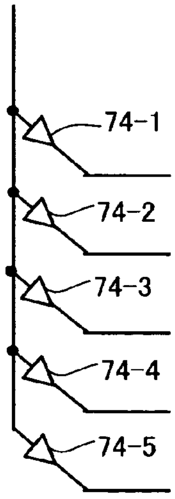
FIG. 14B is a circuit diagram showing in detail a PAN control portion shown in FIG. 14A.

In FIG. 14A, a delay portion 60 delays the input audio signal Si with a sampling period defined as a unit for the delay. The delayed input audio signal Si is output from a given position (tap position) defined on the basis of the unit of sampling period within a predetermined maximum delay time. A PAN control portion 62 is composed of five multipliers 74-1 to 74-5 as shown in FIG. 14B. The multipliers 74-1 to 74-5 multiply signals positioned at specified tap positions in the delay portion 60 by five different attenuation factors to output resultant signals for the five channels.

More specifically, the tap position for the PAN control portion 62 is a position corresponding to a delay time TD0 (time required to propagate an audio for the length of the sound path 110 provided for the direct sound in FIG. 2) of a direct sound. As explained in the description on FIG. 2, a direct sound is to be attenuated on the basis of an attenuation coefficient Zlen inversely proportional to the second power of the length of its sound path, an attenuation coefficient ZG based on a radiating angle θG, and an attenuation coefficient ZR based on an entering angle θR. Consequently, the attenuation factor provided for the respective multipliers 74-1 to 74-5 equals to the resultant obtained by multiplying "Zlen·ZG·ZR" by distribution ratio based on the entering angle θR (see FIG. 4).

Signal processing performed on the signal processing portion 10 is carried out by the DSP substantially. Since the maximum number of channels that have the distribution ratio of 0% or more on the basis of the entering angle θR is two in the present embodiment, computation only for the two channels is required. In other words, the signal processing portion 10 is required to perform only two multiplications for the PAN control portion 62.

Figure 14C:
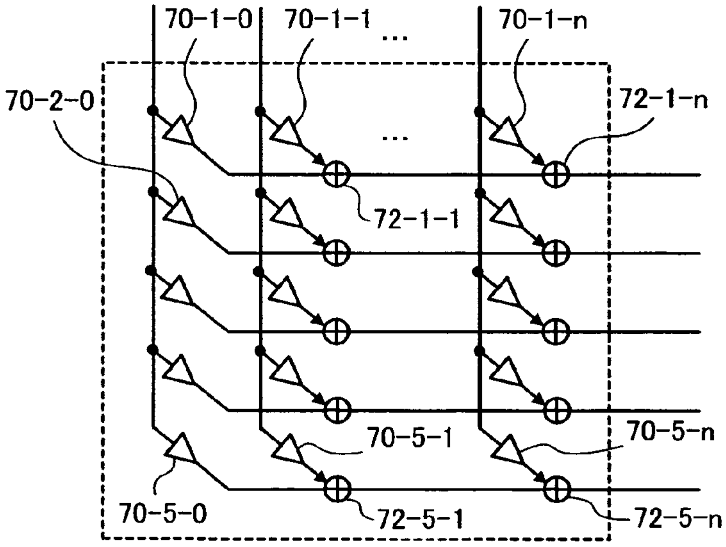
FIG. 14C is a circuit diagram showing in detail a matrix mixer shown in FIG. 14A.

A matrix mixer 64 is provided with circuits similar to the PAN control portion 62 for the number n of sound paths of first reflected sounds, i.e., six lines. The matrix mixer 64 mixes audio signals for each line. As shown in FIG. 14C, more specifically, in the matrix mixer 64, each line has five multipliers 70-1-k to 70-5-k (0 to 5 allocated for k). The matrix mixer 64 also has adder circuits 72-1-k to 72-5-k (1 to 5 allocated for k) that mix the resultants obtained by the multipliers for the respective channels.

Audio signals of the respective lines supplied to the matrix mixer 64 are the audio signals output from tap positions in the delay portion 60, the tap positions corresponding to the delay time of respective first reflected sounds. Similarly to the direct sound, the first reflected sounds are also to be attenuated on the basis of the attenuation coefficients Zlen, ZG, ZR. In addition, the first reflected sounds are to be filtered on a reflecting surface of the acoustic space 102. The filtering is carried out on a later-described filtering portion 69. Consequently, similarly to the case of a direct sound, the attenuation factor provided for the respective multipliers 70-1-k to 70-5-k is a value obtained by multiplying "Zlen·ZG·ZR" by distribution ratio based on the entering angle θR. Similarly to the case of a direct sound, in addition, the signal processing portion 10 is required to perform only two multiplications for each sound path.

A matrix mixer 66 for second reflected sounds is configured similarly to the above-described matrix mixer 64 for first reflected sounds. Since the number n of sound paths of second reflected sounds is eighteen, the matrix mixer 66 is provided with multipliers and adder circuits, the number of which corresponds to the number n of the sound paths. Audio signals of the respective lines supplied to the matrix mixer 66 are the audio signals output from tap positions in the delay portion 60, the tap positions corresponding to the delay time of respective second reflected sounds. In the matrix mixer 66, similarly to the case of first reflected sounds, the attenuation factor provided for the respective multipliers is a value obtained by multiplying "Zlen·ZG·ZR" by distribution ratio based on the entering angle ER.

A filtering portion 68 filters audio signals of the five channels output from the matrix mixer 66 in accordance with a reflecting surface of the acoustic space 102, Each of adder circuits 65 adds an output signal sent from the filtering portion 68 to an output signal of a corresponding channel of the matrix mixer 64. A filtering portion 69, which has characteristics identical to those of the filtering portion 68, filters respective output signals sent from the adder circuits 65. Each of adder circuits 63 adds an output signal sent from the filtering portion 69 to an output signal of a corresponding channel of the PAN control portion 62 to output the resultant signal as an audio signal S_C, S_L, S_R, S_SR, or S_SL. As described above, these audio signals S_C, S_L, S_R, S_SR, S_SL are recorded in the multi-track recorder 51 through the waveform I/O portion 8.

3.2. Processing of the Personal Computer 30

3.2.1. Click Event on Operational Element (FIG. 15)

Next explained will be operations on the personal computer 30. When a specified operation is carried out on the input device 36 of the personal computer 30, a setting screen shown in FIG. 5 through FIG. 12 is displayed on the display unit 34. If any of the operational elements is clicked with a mouse on the setting screen, a mouse click routine shown in FIG. 15 is started.

Figure 15:
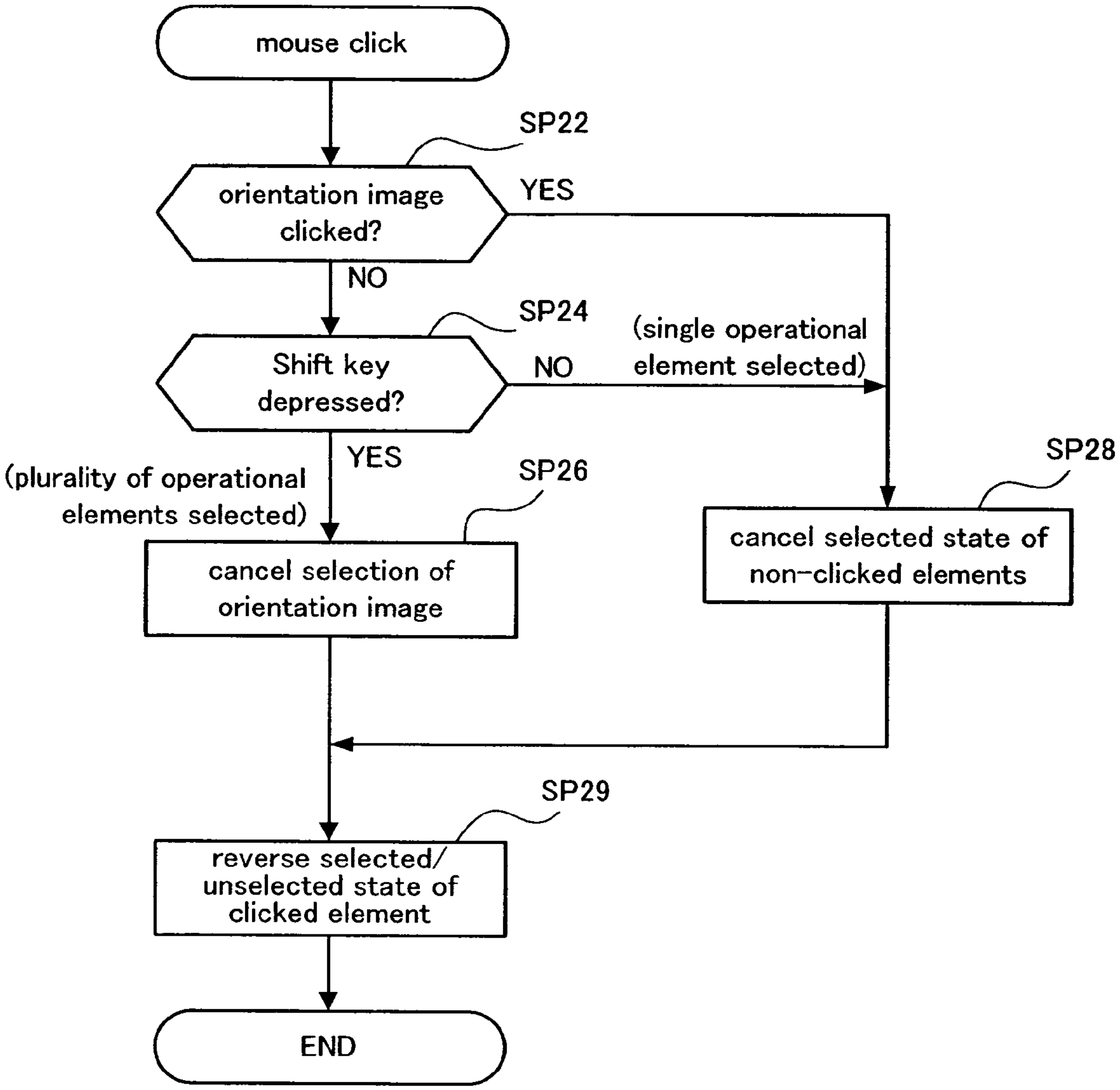
FIG. 15 is a flowchart of a mouse-click routine.

When the routine proceeds to step SP22 in FIG. 15, it is determined whether the clicked operational element is either of the orientation images 210*a*, 212*a*. If yes, the routine proceeds to step SP28 to cancel the selected state of all the operational elements that were not clicked. The routine then proceeds to step SP29 to reverse the state of the clicked operational element from selected to unselected or from unselected to selected. In other words, since the orientation images 210*a*, 212*a* are allowed to be in the selected state only alone, each click on either of the orientation images 210*a*, 212*a* reverses the respective state of the orientation images 210*a*, 212*a* between selected state and unselected state.

If an operational element other than the orientation images 210*a*, 212*a* is clicked, the routine proceeds to step SP24 to determine whether a Shift key on the keyboard of the input device 36 has been depressed. If not, the routine proceeds to step SP28 to carry out the process similar to the above-described case of the orientation images 210*a*, 212*a*. In other words, in a case where a Shift key has not been depressed, the respective operational elements are allowed to be in the selected state only alone. More specifically, all the operational elements that were not clicked are set in unselected state, whereas each click on an operational element reverses the state of the clicked element between selected state and unselected state.

In a case where a Shift key has been depressed with an operational element other than the orientation images 210*a*, 212*a* being clicked, a positive determination is made at step SP24 to proceed to step SP26. If the orientation images 210*a*, 212*a* are in the selected state, the selected state is canceled at step SP26. The routine then proceeds to step SP29 to reverse the selected/unselected state of the clicked operational element. More specifically, in a case where the operational element has been in the selected state, the operational element is changed to the unselected state. In a case where the operational element has been in the unselected state, the operational element is changed to the selected state. Since the state of the non-clicked operational elements other than the orientation images will not be changed in this case, a click on every operational element in the unselected state with a Shift key being depressed results in all the clicked elements being turned to the selected state.

3.2.2. Zoom Operational Event

Figure 16:
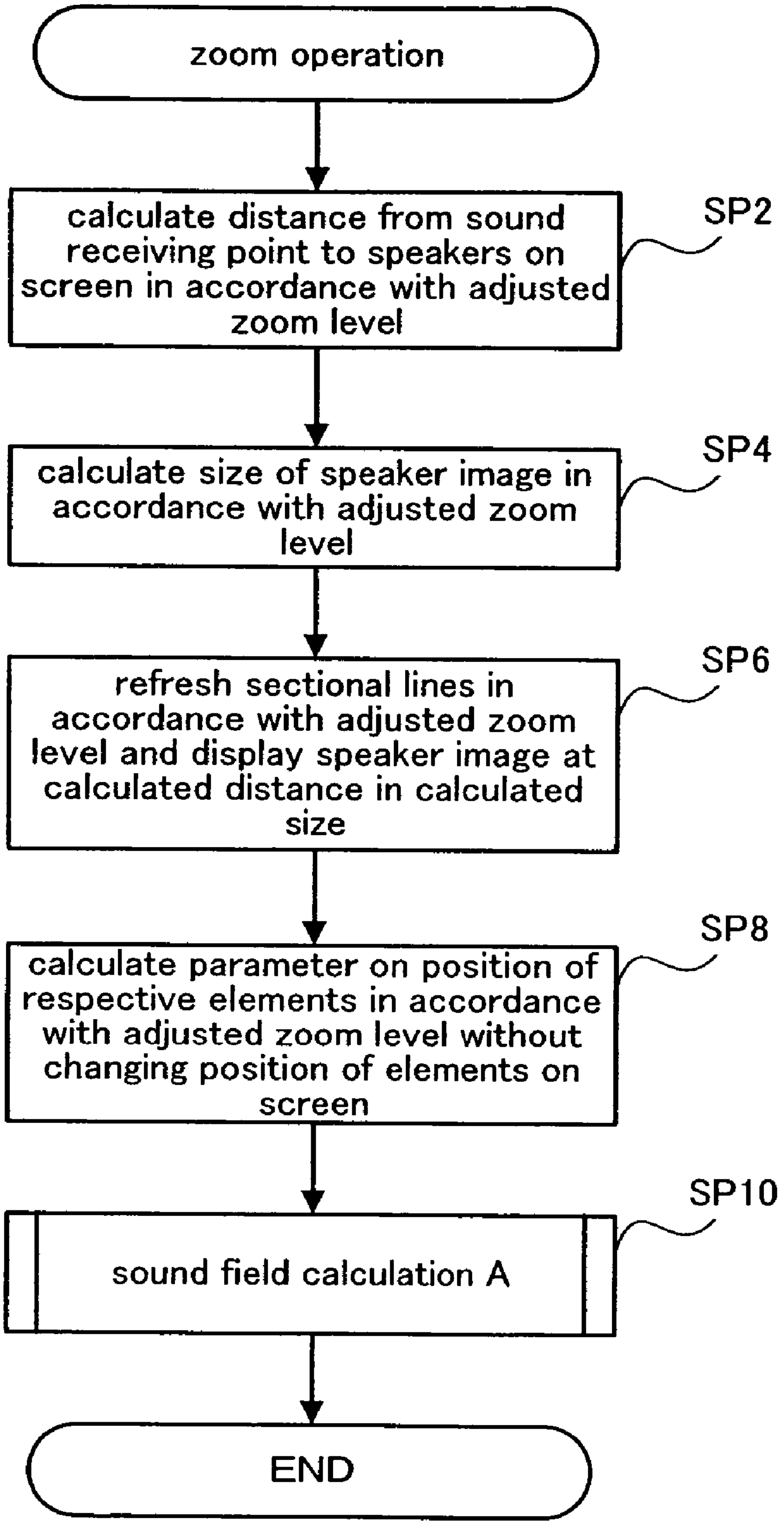
FIG. 16 is a flowchart of a zoom operation event routine.

When the zoom fader 202 is dragged and dropped with a mouse, a zoom operational event routine shown in FIG. 16 is started. When the routine proceeds to step SP2 in the figure, the distance (the number of dots on the display unit 34) from the sound receiving point image 212 to the respective speakers consisting the speaker image 214 on the setting screen is calculated in accordance with the adjusted zoom level (position at which the zoom fader 202 is dropped). More specifically, since it is assumed that the speaker image is located on the circumference of a circle of 2.5 m radius with the sound receiving point 106 centered thereon in the acoustic space 102, the position of the respective speakers consisting the speaker image 214 is figured out on the basis of a scale corresponding to the adjusted zoom level. The routine then proceeds to step SP4 to calculate the size of the speakers consisting the speaker image 214 in accordance with the adjusted zoom level. Due to these steps, user's operation on the zoom fader 202 to zoom in increases the radius of the speaker image 214 and the size of the displayed speakers, while user's operation on the zoom fader 202 to zoom out decreases the radius of the speaker image 214 and the size of the displayed speakers.

The routine then proceeds to step SP6 to refresh the sectional lines 206 in accordance with the adjusted zoom level and to display the speaker image 214 at the calculated distance in the calculated size. The routine then proceeds to SP8 to change the size of the simulated acoustic space 102 (see FIG. 2) and the position of the sound emitting point 104 and the sound receiving point 106 in response to the adjusted zoom level. More specifically, without any change in the position of the respective operational elements displayed on the screen, the size of the acoustic space 102 and the position of the sound emitting point 104 and the sound receiving point 106 are recalculated in accordance with the zoom level.

Due to these steps, as described in FIG. 6 to FIG. 8, an adjustment to the zoom level brings about changes in the position of the respective elements in the acoustic space 102 without changing their positions on a setting screen. The routine then proceeds to step SP10 to invoke a sound field calculation subroutine shown in FIG. 21A. In the sound field calculation subroutine which will be described in detail later, the tap position in the delay portion 60 and the attenuation factor provided for the respective multipliers of the PAN control portion 62 and the matrix mixers 64, 66 are specified in accordance with the settings of the acoustic space 102.

3.2.3. Ctrl Key Event Process

Figure 17A:
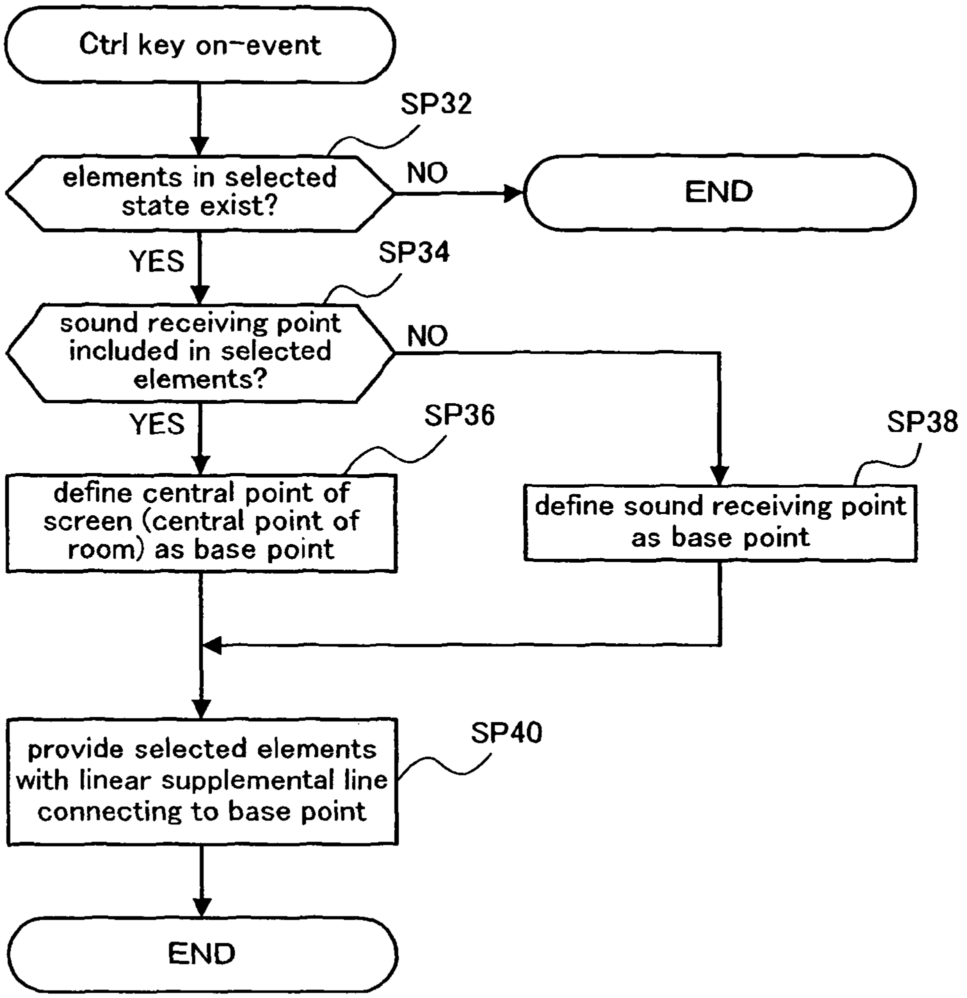
FIG. 17A is a flowchart of a Ctrl-key on-event routine.

When an on-event of a Ctrl key on the keyboard of the input device 36 occurs, a Ctrl key on-event routine shown in FIG. 17A is started. When the routine proceeds to step SP32 in the figure, it is determined whether there are any operational elements in the selected state on the setting screen. If not, the routine is immediately terminated. If yes, on the other hand, the routine proceeds to step SP34 to determine whether the sound receiving point image 212 is included in the operational elements in the selected state. If yes, the routine proceeds to step SP36 to define, as explained in FIG. 10, the central point 240 of the acoustic space outline 204 as the base point. If not at step SP34, on the other hand, the sound receiving point image 212 is defined as the base point as explained in FIG. 9. The routine then proceeds to step SP40 to display, on the setting screen, linear supplemental lines that connect the respective operational elements in the selected state with the base point.

Figure 17B:
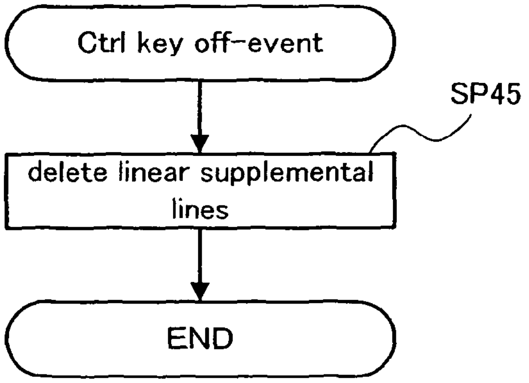
FIG. 17B is a flowchart of a Ctrl-key off-event routine.

When an off-event of a Ctrl key occurs, a Ctrl key off-event routine shown in FIG. 17B is started. When the routine proceeds to step SP45 in the figure, all the linear supplemental lines on the setting screen are deleted to terminate the routine.

3.2.4. Alt Key Event Process

Figure 18A:
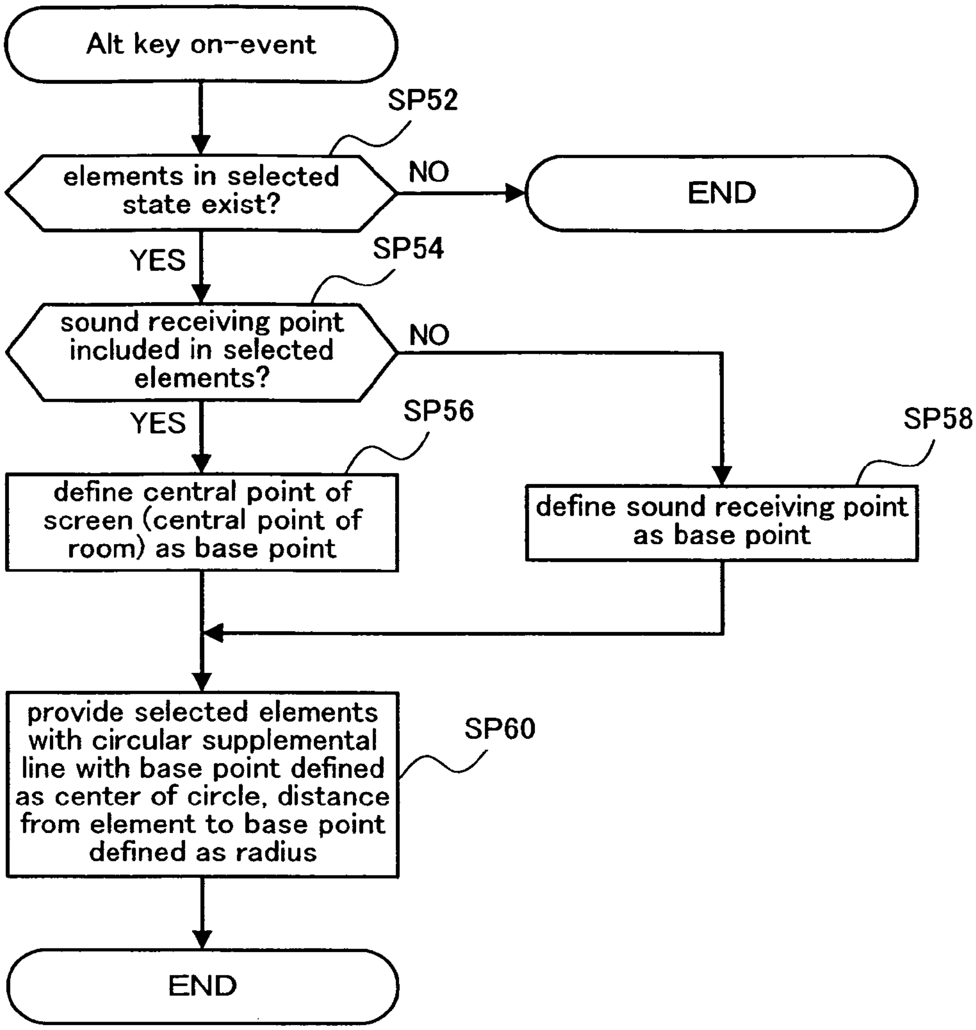
FIG. 18A is a flowchart of an Alt-key on-event routine.

When an on-event of an Alt key on the keyboard occurs, an Alt key on-event routine shown in FIG. 18A is started. When the routine proceeds to step SP52 in the figure, it is determined whether there are any operational elements in the selected state on the setting screen. If not, the routine is immediately terminated. If yes, on the other hand, the routine proceeds to step SP54 to determine whether the sound receiving point image 212 is included in the operational elements in the selected state. If yes, the routine proceeds to step SP56 to define, as explained in FIG. 12, the central point 240 of the acoustic space outline 204 as the base point. If not at step SP54, on the other hand, the routine proceeds to step SP58 to define the sound receiving point image 212 as the base point as explained in FIG. 11. The routine then proceeds to step SP60 to display, on the setting screen, circular supplemental lines having the shape of a circle or an arc passing through the respective operational elements in the selected state, the center of the circle being the base point.

Figure 18B:
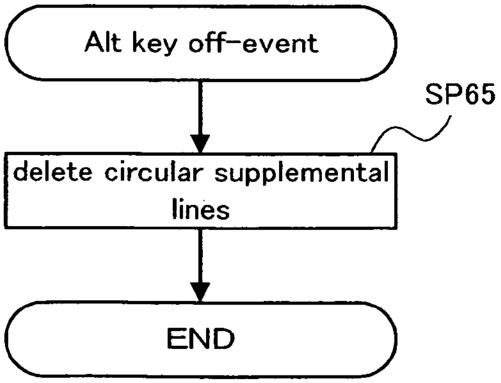
FIG. 18B is a flowchart of an Alt-key off-event routine.

When an off-event of an Alt key occurs, an Alt key off-event routine shown in FIG. 18B is started. When the routine proceeds to step SP65 in the figure, all the circular supplemental lines on the setting screen are deleted to terminate the routine.

Figure 19:
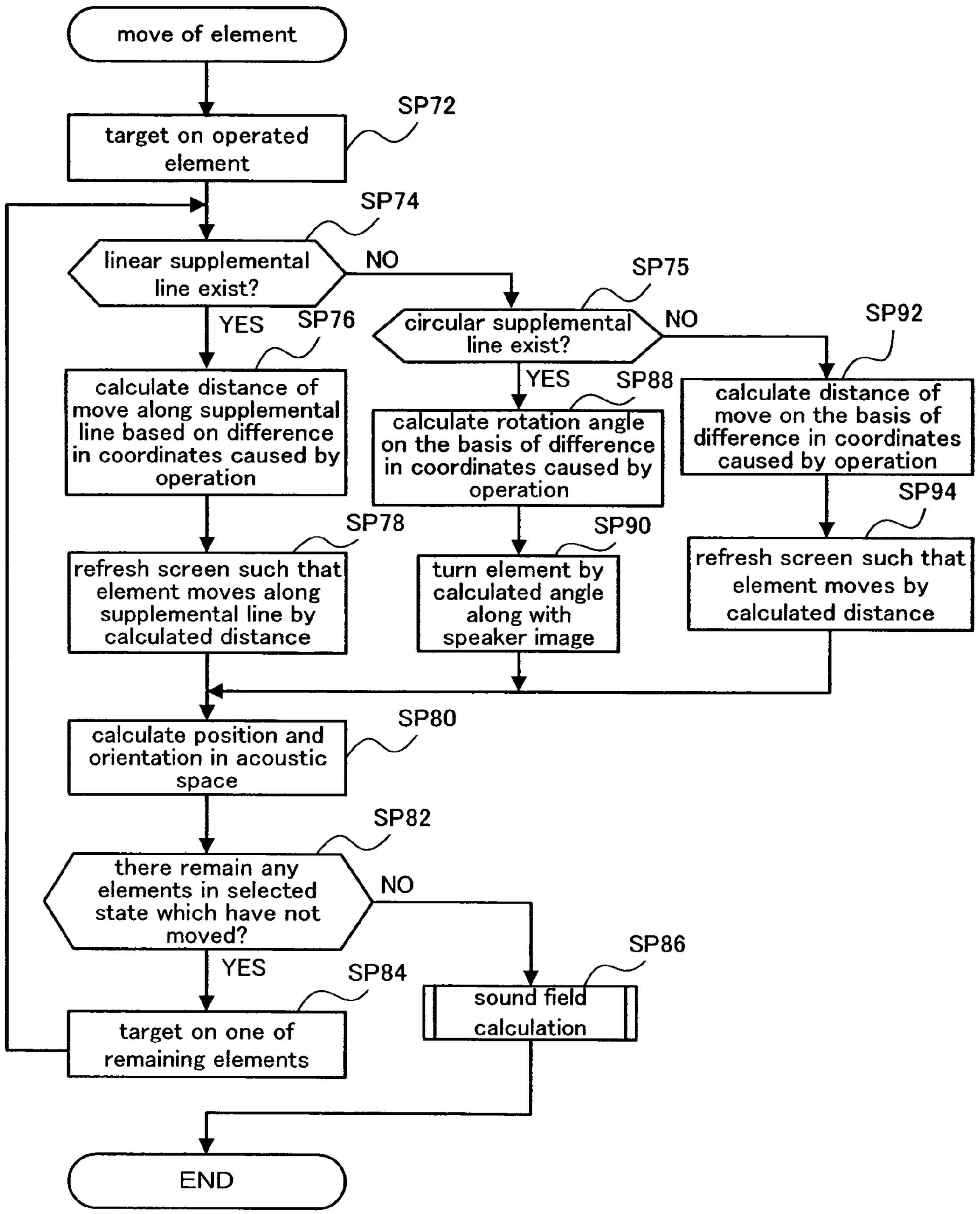
FIG. 19 is a flowchart of an element move event routine.

3.2.5. Element Move Process (1) Case Where Linear Supplemental Line is Displayed If any of the operational elements in the selected state is dragged and dropped with a mouse, an element move event routine shown in FIG. 19 is started. When the routine proceeds to step SP72 in FIG. 19, the operational element that has been dragged and dropped is selected as the target to be affected by the routine. The routine then proceeds to step SP74 to determine whether a linear supplemental line is displayed. If yes, the routine proceeds to step SP76 to calculate the distance the operational element has moved along the linear supplemental line on the basis of the coordinates of the operated operational element before and after the drag-and-drop operation. The routine then proceeds to step SP78 to refresh the setting screen such that the target element moves along the linear supplemental line by the calculated distance.

The routine then proceeds to step SP80 to figure out, on the basis of the refreshed setting screen, the position and the orientation of the operational element in the acoustic space 102. The routine then proceeds to step SP82 to determine whether there remain any operational elements in the selected state for which the process for moving in the acoustic space 102 (step SP80) has not yet been carried out. If yes, the routine proceeds to step SP84 to select one of the remaining elements as a target. The routine then repeats the processes of steps SP74 through SP80 for the targeted element. In this case, however, calculated at step SP76 is the rate of expansion or contraction of the distance the dragged and dropped operational element has moved to figure out, on the basis of the calculated rate of expansion or contraction, the distance the targeted element is to be moved along its linear supplemental line. When the above processes are done for all the operational elements in the selected state, a negative determination is made at step SP82. The routine then proceeds to step SP86 to invoke the later-described sound field calculation subroutine shown in FIG. 21A to specify the tap position in the delay portion 60 and the attenuation factor provided for the respective multipliers of the PAN control portion 62 and the matrix mixers 64, 66.

(2) Case where Circular Supplemental Line is Displayed

In a case where a circular supplemental line is displayed on the setting screen, steps SP88, SP90 are carried out instead of the above-described steps SP76, SP78. At step SP88, on the basis of the coordinates of the dragged and dropped operational element before and after the drag-and-drop operation, the rotation angle on the circular supplemental line is calculated. The routine then proceeds to step SP90 to refresh the setting screen such that the targeted element turns the calculated rotation angle on its corresponding circular supplemental line. In a case where there remain any operational elements in the selected state for which the process for moving in the acoustic space 102 (step SP90) has not yet been carried out, circulating processing consisting of steps SP74, SP75, SP88, SP90, and SP80 through SP84 is executed to turn the remaining operational elements by the rotation angle on their corresponding circular supplemental lines. Consequently, the process of step SP88 for calculating rotation angle is not substantially carried out in this circulating processing.

(3) Case where No Supplemental Line is Displayed

In a case where no supplemental line is displayed on the setting screen, steps SP92, SP94 are carried out instead of the above-described steps SP76, SP78. At step SP92, on the basis of the coordinates of the dragged and dropped operational element before and after the drag-and-drop operation, the distance the operational element has moved vertically and horizontally is calculated. The routine then proceeds to step SP94 to refresh the setting screen such that the targeted element moves vertically and horizontally on the screen by the calculated distance. Processes other than the above are done similarly to the case of linear supplemental line. However, operational elements in the selected state other than the dragged and dropped element are moved vertically and horizontally, by circulating processing consisting of steps SP74, SP75, SP92, SP94 and SP80 through SP84, by the distance the dragged and dropped operational element has moved. Consequently, the process of step SP92 for calculating distance of move is not substantially carried out in this circulating processing. In a case where the position of the sound receiving point image 212 or the direction of the sound receiving point directional image 212*a* is changed in the above-described steps SP78, SP90 or SP94, the position or the direction of the speaker image 214 is also changed in response to the change.

3.2.6. Automatic Move Process

Figure 20:
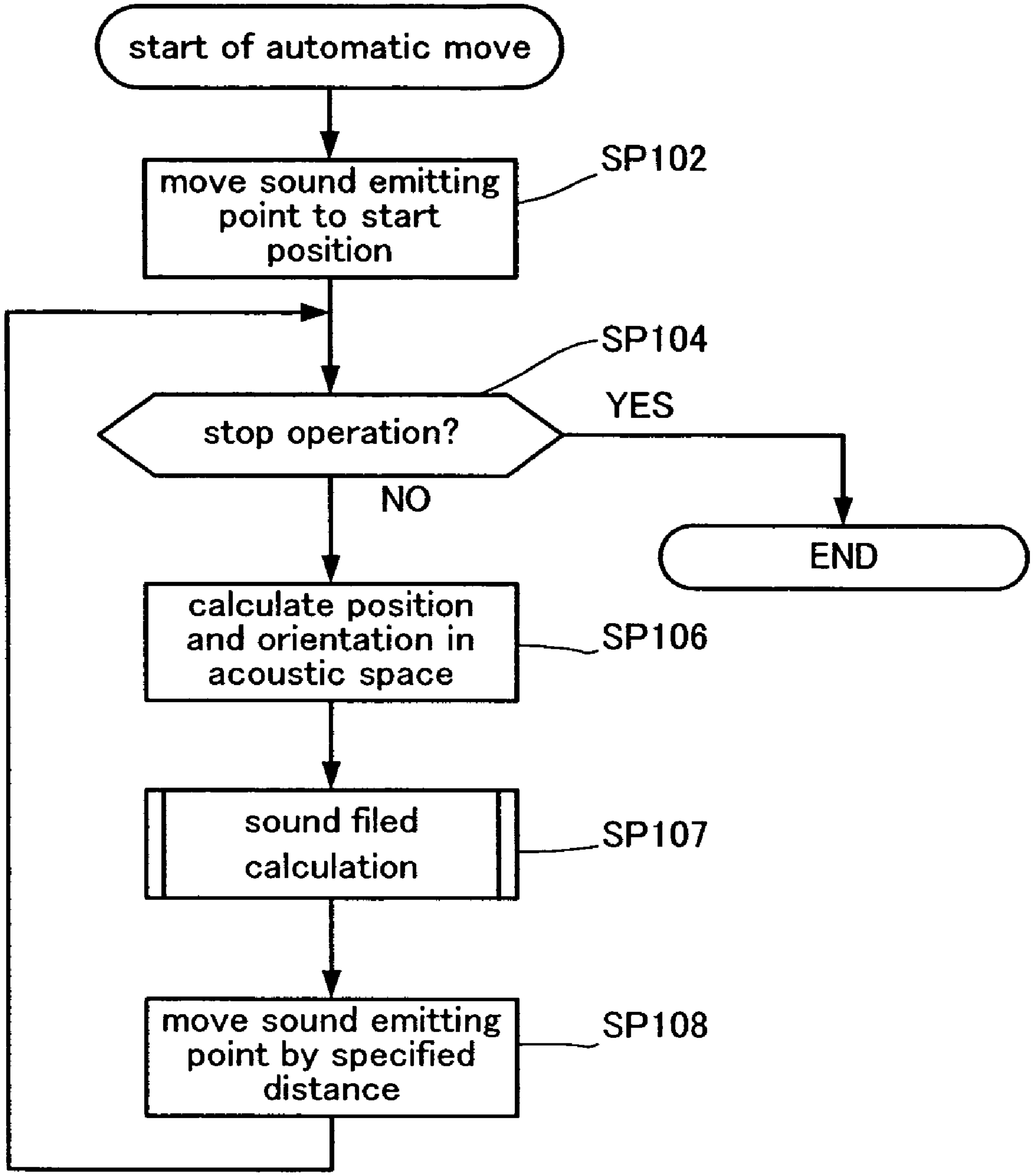
FIG. 20 is a flowchart of an automatic move routine.

If the user performs a specified operation on the keyboard of the input device 36, an automatic move routine shown in FIG. 20 is started. When the routine proceeds to step SP102 in the figure, the sound emitting point image 210 automatically moves to the start position of the course line 220, i.e., to the position of the course point image 222. The routine then proceeds to step SP104 to determine whether a specified stop operation has been performed on the keyboard. If a positive determination is made at step SP104, the routine is immediately terminated.

If a negative determination is made at step SP104, on the other hand, the routine proceeds to step SP106 to figure out the position and the orientation of the sound emitting point image 210 in the acoustic space 102. The routine then proceeds to step SP107 to invoke the later-described sound field calculation subroutine shown in FIG. 21A to specify the tap position in the delay portion 60 and the attenuation factor provided for the respective multipliers of the PAN control portion 62 and the matrix mixers 64, 66. The routine then proceeds to step SP108 to change the position of the sound emitting point image 210 such that the sound emitting point image 210 moves along the course line 220 by a specified distance. The direction in which the sound emitting point image 210 moves along the course line 220 is set to the direction in which the sound emitting point image 210 repeatedly passes through the course point images 222, 224, 226, 222 . . . in their order. After step SP108, processes of steps SP106 through SP108 are repeated until the stop operation is performed.

3.2.7. Sound Field Calculation Process

Figure 21A:
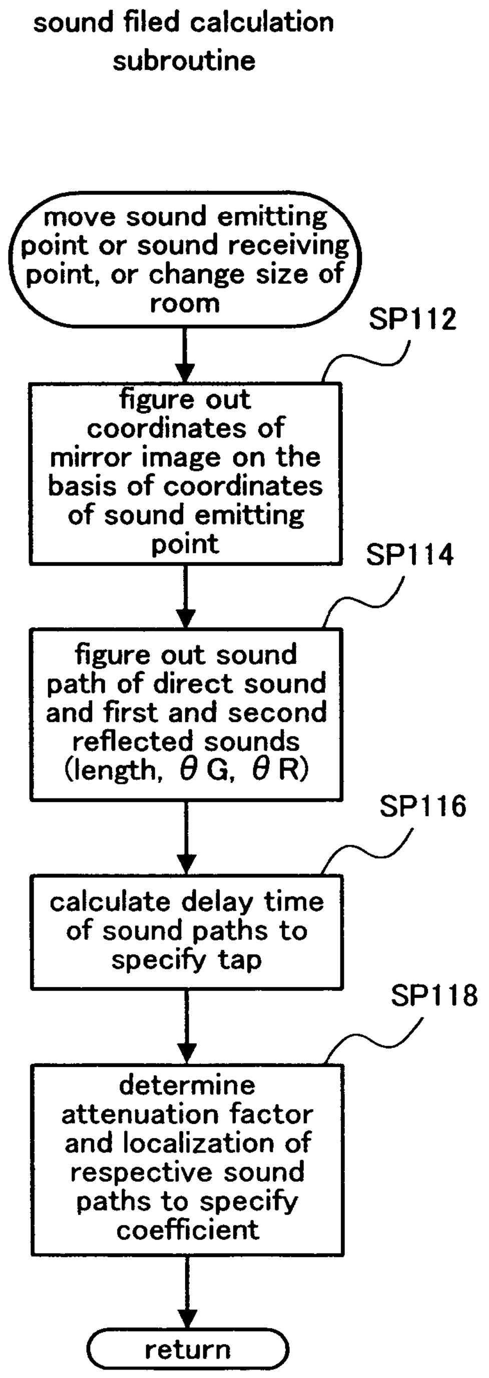
FIG. 21A is a flowchart of a sound field calculation subroutine for moving the sound emitting point, moving the sound receiving point, and changing the room size.

Next explained will be the sound field calculation subroutine invoked at the above-described steps SP10, SP86 and SP107. In a case where the sound emitting point image 210 or the sound receiving point image 212 is moved, or in a case where the zoom level is changed, the routine shown in FIG. 21A is invoked. When the routine proceeds to step SP112 in the figure, the positions of six first mirror images and eighteen second mirror images are figured out on the basis of the coordinates of the sound emitting point 104 in the acoustic space 102. When the routine then proceeds to step SP114, the length, the radiating angle θG, and the entering angle θR of a sound path of direct sound, of six sounds paths of first reflected sound, and of eighteen sound paths of second reflected sound are obtained, respectively.

The routine then proceeds to step SP116 to calculate, on the basis of the length of the respective sound paths, the respective delay time required for sounds to reach the sound receiving point 106 along the respective sound paths. In accordance with the calculated results, the tap position of the respective input signals for the PAN control portion 62, the matrix mixers 64, 66 is set to the position corresponding to the respectively calculated delay time. The routine then proceeds to step SP118 to obtain the attenuation factor (Zlen·ZG·ZR) of the respective sound paths on the basis of the attenuation coefficient Zlen inversely proportional to the second power of the length of the respective sound paths, the attenuation coefficient ZG based on the radiating angle θG, and the attenuation coefficient ZR based on the entering angle θR. The resultant obtained by multiplying the attenuation factor by the distribution ratio based on the entering angle θR (see FIG. 4) is provided for the respective multipliers of the PAN control portion 62 and the matrix mixers 64, 66 as attenuation factor.

Figure 21B:
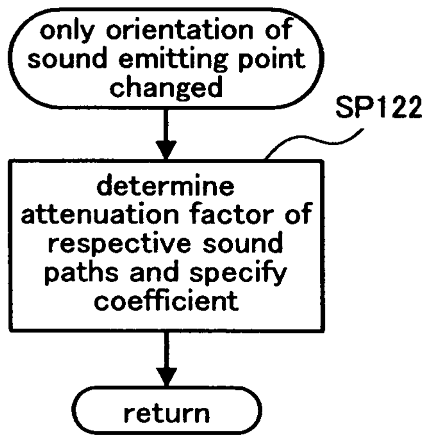
FIG. 21B is a flowchart of a sound field calculation subroutine on a change in the orientation of the sound emitting point.

In a case where only the orientation of the sound emitting point 104 is changed, a routine shown in FIG. 21B is invoked. The change in the orientation of the sound emitting point 104 also causes the change in the radiating angle θG of the respective sound paths, resulting in the change in the attenuation coefficient ZG obtained on the basis of the radiating angle θG. Due to the changes, the attenuation factor (Zlen·ZG·ZR) of the respective sound paths is recalculated on the basis of the changed attenuation coefficient ZG. The resultant obtained by multiplying the recalculated attenuation factor by the distribution ratio based on the entering angle θR (see FIG. 4) is provided for the respective multipliers of the PAN control portion 62 and the matrix mixers 64, 66 as the attenuation factor.

Figure 21C:
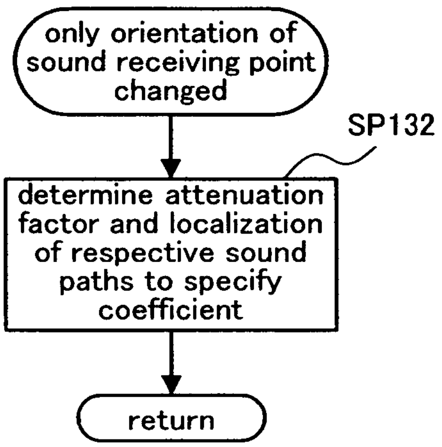
FIG. 21C is a flowchart of a sound field calculation subroutine on a change in the orientation of the sound receiving point.

In a case where only the orientation of the sound receiving point 106 is changed, a routine shown in FIG. 21C is invoked. The change in the orientation of the sound receiving point 106 also causes the change in the entering angle θR of the respective sound paths, resulting in the change in the attenuation coefficient ZR obtained on the basis of the entering angle θR. Due to the changes, the attenuation factor (Zlen·ZG·ZR) of the respective sound paths is recalculated on the basis of the changed attenuation coefficient ZR. Furthermore, since the change in the entering angle θR also causes the change in the distribution ratio (FIG. 4), the attenuation factor provided for the respective multipliers in the PAN control portion 62 and the matrix mixers 64, 66 is determined on the basis of the recalculated attenuation factor (Zlen·ZG·ZR) of the respective sound paths and the recalculated distribution ratio. Since no change is made to the length of the respective sound paths in FIGS. 21B and 21C, however, there is no need to recalculate the tap position of the delay portion 60.

4. Modifications

The present invention is not limited to the above-described embodiment, but various modifications can be made as described below.

(1) In the above-described embodiment, programs run on the personal computer 30 and the signal processing portion 10 conduct various data processing. However, these programs may be stored in a storage medium such as CD-ROM and flexible disk for distribution. Alternatively, these programs may be distributed through a transmission line.

(2) In the above-described embodiment, the personal computer 30 determines the tap position of the delay portion 60 and the attenuation factor of the respective multipliers in the PAN control portion 62 and the matrix mixers 64, 66, while the signal processing portion 10 in the digital mixer 1 conducts substantial signal processing. However, the processing done by the personal computer 30 may be performed by the CPU 18 in the digital mixer 1.

(3) In the above-described embodiment, parameters (tap position of the delay portion 60, attenuation factor of the respective multipliers of the PAN control portion 62 and the matrix mixers 64, 66, etc.) figured out by the personal computer 30 are directly applied to the signal processing portion 10. However, the above-obtained parameters may be stored, for example, in any track of the multi-track recorder 51 so that the stored parameters are read out later to synthesize audio signals S_C, S_L,S_R, S_SR, S_SL.

What is claimed is:

1. A parameter generating apparatus for generating a parameter for use in simulation of acoustic characteristics of an acoustic space in which elements including a sound emitting point for emitting a sound and a sound receiving point for receiving the sound emitted from the sound emitting point are placed, the parameter being used for processing an audio signal output from the sound emitting point to synthesize an audio signal to be received at the sound receiving point, the parameter generating apparatus comprising:

a display control portion for displaying, on a display unit, a plurality of operational elements including at least a sound emitting point image representative of the sound emitting point and a sound receiving point image representative of the sound receiving point, and an acoustic space image representative of the acoustic space;

a selection portion for simultaneously selecting a plurality of operational elements from among the entire operational elements in accordance with a user's operation;

a transfer limiting portion for limiting a manner in which the simultaneously selected operational elements are transferred;

a transfer determining portion for determining, when transfer of the simultaneously selected operational elements is instructed, a state in which the simultaneously selected operational elements are transferred on the basis of the instruction for transfer and the limited transfer manner;

a display position modifying portion for modifying the position at which the simultaneously selected operational elements are displayed on the display unit on the basis of the determined transfer state;

an acoustic space internal position modifying portion for modifying, on the basis of the determined transfer state, information representative of the position of operational elements placed in the acoustic space; and a parameter generating portion for generating the parameter on the basis of the resultant information modified by the acoustic space internal position modifying portion.

2. A parameter generating apparatus according to claim 1 wherein the transfer manner limited by the transfer limiting portion allows transfer of each of the simultaneously selected operational elements only along a straight line connecting a given base point on the display unit with the simultaneously selected operational element; and the transfer state is a rate of expansion or contraction of a distance between the base point and each of the simultaneously selected operational elements compared before and after transfer of the simultaneously selected operational element along the straight line;

the parameter generating apparatus further comprising:

a linear supplemental line display portion for displaying, on the display unit, a linear supplemental line along the straight line.

3. A parameter generating apparatus according to claim 2 further comprising:

a determination portion for determining whether the simultaneously selected operational elements include the sound receiving point image;

a first base point selecting portion for selecting, on condition that a positive determination is made by the determination portion, a central point of the acoustic space image as the base point; and a second base point selecting portion for selecting, on condition that a negative determination is made by the determination portion, the sound receiving point image as the base point.

4. A parameter generating apparatus according to claim 1 wherein the transfer manner limited by the transfer limiting portion allows transfer of each of the simultaneously selected operational elements only along a circumference passing through the simultaneously selected operational element with a given base point on the display unit centered thereon; and the transfer state indicates a rotation angle by which the simultaneously selected operational elements rotate along the circumference;

the parameter generating apparatus further comprising:

a circular supplemental line display portion for displaying, on the display unit, a circular supplemental line along the circumference.

5. A parameter generating apparatus according to claim 4 further comprising:

a determination portion for determining whether the simultaneously selected operational elements include the sound receiving point image;

a first base point selecting portion for selecting, on condition that a positive determination is made by the determination portion, a central point of the acoustic space image as the base point; and a second base point selecting portion for selecting, on condition that a negative determination is made by the determination portion, the sound receiving point image as the base point.

6. A parameter generating apparatus according to claim 1 wherein the transfer limiting portion selects as the limited transfer manner, on condition that a given first limiting operation is performed, a first transfer manner which allows each of the simultaneously selected operational elements to transfer only along a straight line connecting a given base point on the display unit with the selected operational element, and selects as the limited transfer manner, on condition that a given second limiting operation is performed, a second transfer manner which allows each of the selected operational elements to transfer only along a circumference passing through the simultaneously selected operational element with the base centered thereon; and the transfer determining portion selects as the transfer state, when the first limiting operation is performed, a rate of expansion or contraction of a distance between the base point and each of the simultaneously selected operational elements compared before and after transfer of the simultaneously selected operational element along the straight line, and selects as the transfer state, when the second limiting operation is performed, a rotation angle by which the simultaneously selected operational elements rotate along the circumference;

the parameter generating apparatus further comprising:

a supplemental line display portion for displaying on the display unit, when the first limiting operation is performed, a linear supplemental line along the straight line, and displaying on the display unit, when the second limiting operation is performed, a circular supplemental line along the circumference.

7. A parameter generating apparatus according to claim 6 further comprising:

a determination portion for determining whether the simultaneously selected operational elements include the sound receiving point image;

a first base point selecting portion for selecting, on condition that a positive determination is made by the determination portion, a central point of the acoustic space image as the base point; and a second base point selecting portion for selecting, on condition that a negative determination is made by the determination portion, the sound receiving point image as the base point.

8. A computer readable storage medium storing a computer program applied to a parameter generating apparatus for generating a parameter for use in simulation of acoustic characteristics of an acoustic space in which elements including a sound emitting point for emitting a sound and a sound receiving point for receiving the sound emitted from the sound emitting point are placed, the parameter being used for processing an audio signal output from the sound emitting point to synthesize an audio signal to be received at the sound receiving point, the computer program including:

a display control step for displaying, on a display unit, a plurality of operational elements including at least a sound emitting point image representative of the sound emitting point and a sound receiving point image representative of the sound receiving point, and an acoustic space image representative of the acoustic space;

a selection step for simultaneously selecting a plurality of operational elements from among the entire operational elements in accordance with a user's operation;

a transfer limiting step for limiting a manner in which the simultaneously selected operational elements are transferred;

a transfer determining step for determining, when transfer of the simultaneously selected operational elements is instructed, a state in which the simultaneously selected operational elements are transferred on the basis of the instruction for transfer and the limited transfer manner;

a display position modifying step for modifying the position at which the simultaneously selected operational elements are displayed on the display unit on the basis of the determined transfer state;

an acoustic space internal position modifying step for modifying, on the basis of the determined transfer state, information representative of the position of operational elements placed in the acoustic space; and a parameter generating step for generating the parameter on the basis of the resultant information modified by the acoustic space internal position modifying step.

* * * * *